(12) United States Patent  (10) Patent No.: US 7,504,651 B2
Urbon et al.                (45) Date of Patent: *Mar. 17, 2009

(54) SHEET SCANNING APPARATUS

(75) Inventors: Michael P. Urbon, Churchville, NY (US); William C. Wendlandt, Rush, NY (US)

(73) Assignee: Carestream Health, Inc., Rochester, NY (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/507,233

(22) Filed: Aug. 21, 2006

(65) Prior Publication Data
US 2008/0042082 A1  Feb. 21, 2008

(51) Int. Cl.
*B65H 5/00* (2006.01)
(52) U.S. Cl. ..................................... 250/589
(58) Field of Classification Search ............ 250/589
See application file for complete search history.

(56) References Cited

U.S. PATENT DOCUMENTS

| 4,665,542 | A | 5/1987 | Scribano |
| 5,265,865 | A | 11/1993 | Agano et al. |
| 5,276,333 | A | 1/1994 | Robertson |
| 6,437,359 | B1 | 8/2002 | Hall et al. |
| 6,683,315 | B2 | 1/2004 | Wendlandt et al. |
| 6,770,900 | B2 | 8/2004 | Minagawa |
| 6,784,448 | B2 | 8/2004 | Neriishi et al. |
| 6,949,759 | B2 | 9/2005 | Yonekawa |
| 2008/0042081 | A1* | 2/2008 | Urbon et al. .......... 250/584 |

FOREIGN PATENT DOCUMENTS

| EP | 0 919 857 | 6/1999 |
| EP | 1 102 118 | 5/2001 |
| EP | 1 391 749 | 2/2004 |

* cited by examiner

*Primary Examiner*—David P Porta
*Assistant Examiner*—Shun Lee

(57) ABSTRACT

A scanning apparatus for scanning a sheet as the sheet is transported in a substantially vertical transport direction. The scanning apparatus includes a scan housing; first, second, and third couplings; and a transport apparatus. The scan housing supports an optical scanning apparatus. The second and third couplings allow at least two degrees of rotation of the scan housing with respect to a horizontal axis and constrain movement of the scan housing in a substantially vertical transport direction. The transport apparatus is coupled to the scan housing for guiding the sheet past the scan housing in the substantially vertical transport direction.

14 Claims, 29 Drawing Sheets

SHEET SCANNING APPARATUS

FIELD OF THE INVENTION

The invention generally relates to computed radiography, and in particular to an apparatus for scanning a stimulable phosphor medium having an exposed radiographic image formed thereon.

BACKGROUND OF THE INVENTION

The field of computed radiography (CR) is well known. In computed radiography, x-rays are directed through a subject and onto a stimulable phosphor storage medium that stores a resulting image. The stimulable phosphor medium is subsequently provided to a scanning/reader apparatus, where the stimulable phosphor medium is stimulated to emit a radiation pattern that is indicative of the image formed by the x-rays. Advantageously, the stimulable phosphor medium can be erased and re-used.

In one arrangement of the stimulable phosphor storage medium, the stimulable phosphor medium is a flexible sheet suitable for transport through a scanning apparatus. For example, U.S. Pat. No. 6,770,900 (Minagawa) entitled "Mechanical [Apparatus] for Discharging Sheet-Like Member Container" describes an apparatus that guides a flexible sheet from a cassette and past a scan head and erasure apparatus, returning the erased flexible sheet into the cassette. U.S. Pat. No. 5,265,865 entitled "Stimulable Phosphor Sheet Feeding and Storing Mechanism and Stimulable Phosphor Sheet Cassette" (Agano) describes a scanning apparatus for automating the reading function and a cassette mechanism that holds the stimulable phosphor sheet during imaging, shipment, or storage.

An alternative arrangement to the flexible sheet is a computed radiography medium formed from a rigid sheet/plate. A rigid stimulable phosphor storage medium has advantages over flexible sheets, including durability and ease of handling. As a further benefit, a rigid substrate works well for needle phosphors, advantaged over other phosphor shapes in digital radiography for its imaging characteristics. Rigid stimulable phosphor storage media is described in U.S. Pat. No. 6,784,448 (Neriishi) entitled "Method for Reading Radiation Image from Stimulable Phosphor Sheet" which describes a scanning apparatus and method employing a rigid sheet. Commonly assigned U.S. Pat. No. 6,437,359 (Hall) entitled "CR Reader with Vertical Scanning" describes using a vertical travel path for directing a stimulable phosphor medium past scanning and erasure components. Commonly assigned U.S. Pat. No. 6,683,315 (Wendlandt) entitled "Storage Phosphor Cassette" and U.S. Pat. No. 5,276,333 (Robertson) entitled "X-Ray Cassette Having Removable Photographic Element" describes embodiments of cassette apparatus for a rigid stimulable phosphor sheet.

An advantage of the rigid stimulable phosphor medium relates to the "footprint" or area required by the reader apparatus for scanning the rigid medium in automated fashion. One example proposed for minimizing footprint is given in U.S. Pat. No. 6,949,759 (Yonekawa) entitled "Radiographic Image Reading Apparatus", which describes a pivoting feed and registration mechanism with complex mechanisms for internal handling of the rigid stimulable phosphor medium.

Apparatus have been investigated for providing automated scanning and processing of rigid stimulable phosphor medium, however, cost and mechanical complexity can be significant drawbacks. Accurate registration of the scanning apparatus to the imaged stimulable phosphor medium needs to be maintained. Even where a straightforward transport path is maintained for handling the stimulable phosphor medium, it can be difficult to maintain proper registration of the scanning apparatus to the stimulable medium without adding cost and complexity.

Accordingly, it is desired to provide an apparatus for scanning a stimulable phosphor medium that provides accurate scanning registration, reduces the footprint, and is relatively low cost.

SUMMARY OF THE INVENTION

An aspect of the present invention to provide a scanning apparatus for scanning a sheet as the sheet is transported in a substantially vertical transport direction y transverse to an optical axis z that is normal to the surface of the sheet. The scanning apparatus comprises: a scan housing supporting an optical scanning apparatus and extending in the direction of a substantially horizontal axis x; a first coupling extending from a supporting frame to a first support point on the scan housing; second and third couplings extending from the supporting frame to the scan housing, wherein the second and third couplings provide axial alignment relative to the horizontal axis x, wherein, relative to the horizontal axis x, the first coupling is disposed between the second and third couplings, and wherein the second and third couplings allow at least two degrees of rotation of the scan housing with respect to the horizontal axis x and constrain movement of the scan housing in the substantially vertical transport direction y; and a transport apparatus coupled to the scan housing for guiding the sheet past the scan housing in the substantially vertical transport direction.

An advantage of the present invention is that it provides for a small footprint.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Reference is made to commonly assigned application U.S. Ser. No. (Kodak Docket No. 89609), entitled "APPARATUS FOR SCANNING STIMULABLE PHOSPHOR MEDIUM", and filed on common date in the names of Urbon et al., and which is assigned to the assignee of this application.

A cross reference is made to commonly assigned application U.S. Ser. No. (Kodak Docket No. 92909), entitled "A RADIATION IMAGING CASSETTE", and filed on common date in the names of Wendlandt et al., and which is assigned to the assignee of this application.

It is noted that a "rigid" or "semi-rigid" phosphor sheet relate to substrate media, and may be of particular use with needle phosphors. Some CR systems use a flexible phosphor sheet. The rigidity or stiffness of a sheet is conventionally characterized as the product of its elastic modulus E and the cubed value of the sheet thickness t, that is: $Et^3$ As a guideline, a sheet that would be considered at least semi-rigid in this application would have a modulus of elasticity E of at least 500,000 psi and thickness t ranging from about t=0.02 to about t=0.5 inches.

Figure 1:
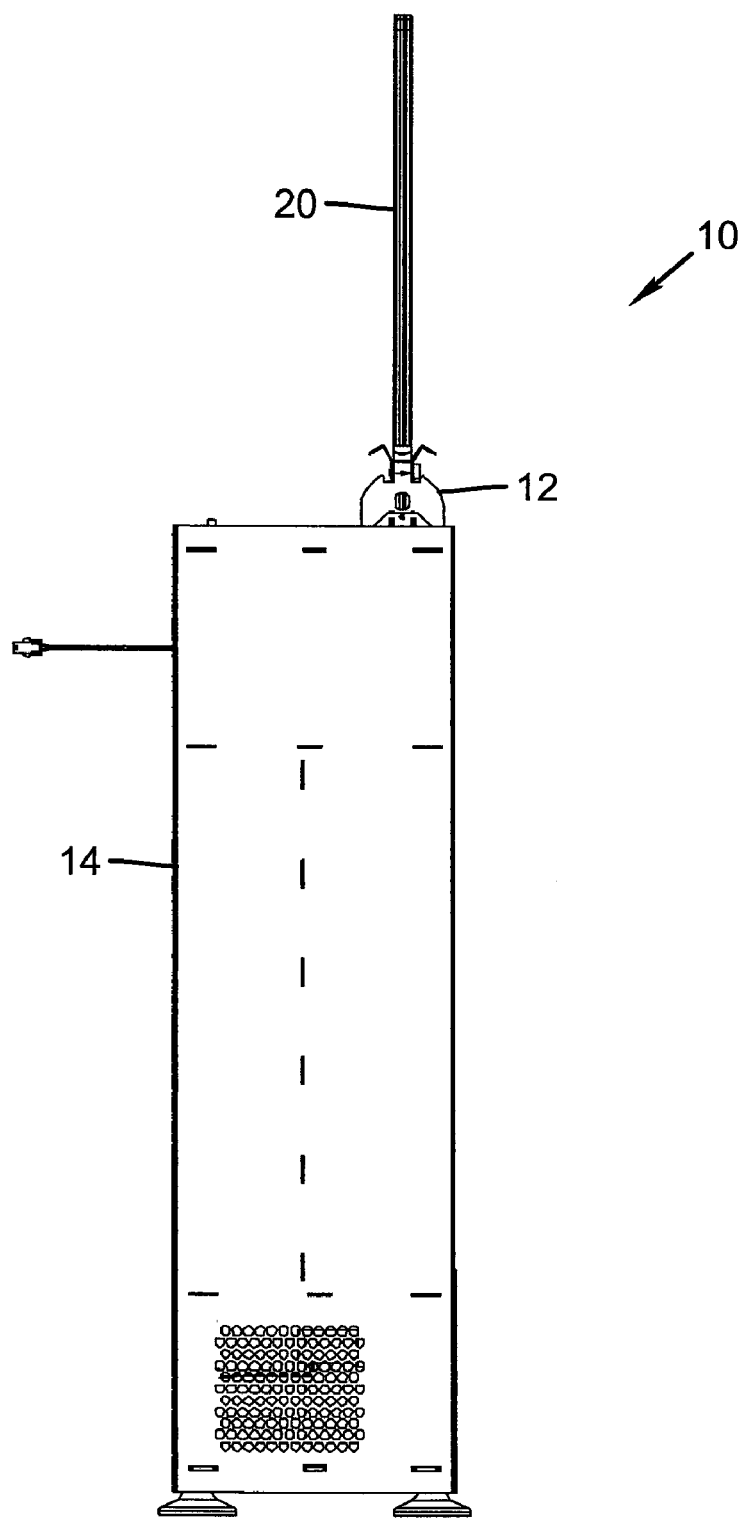
FIG. 1 shows a side view of a radiation image data reading apparatus according to the present invention.

Referring to FIG. 1, there is shown, in side view, a radiation data reading apparatus 10 according to the present invention. Radiation data reading apparatus 10 reads a radiographic image that has been obtained using an x-ray system (not shown) and has been stored on a stimulable phosphor medium that is housed within a cassette 20. Cassette 20 is designed to seat in a receiving/loading section 12 that includes the components to extract the stimulable phosphor medium from cassette 20 and restore it into position once a scanning and an erasure process are complete. Scanning and erasure components are housed in a housing/chassis 14.

Figure 2:
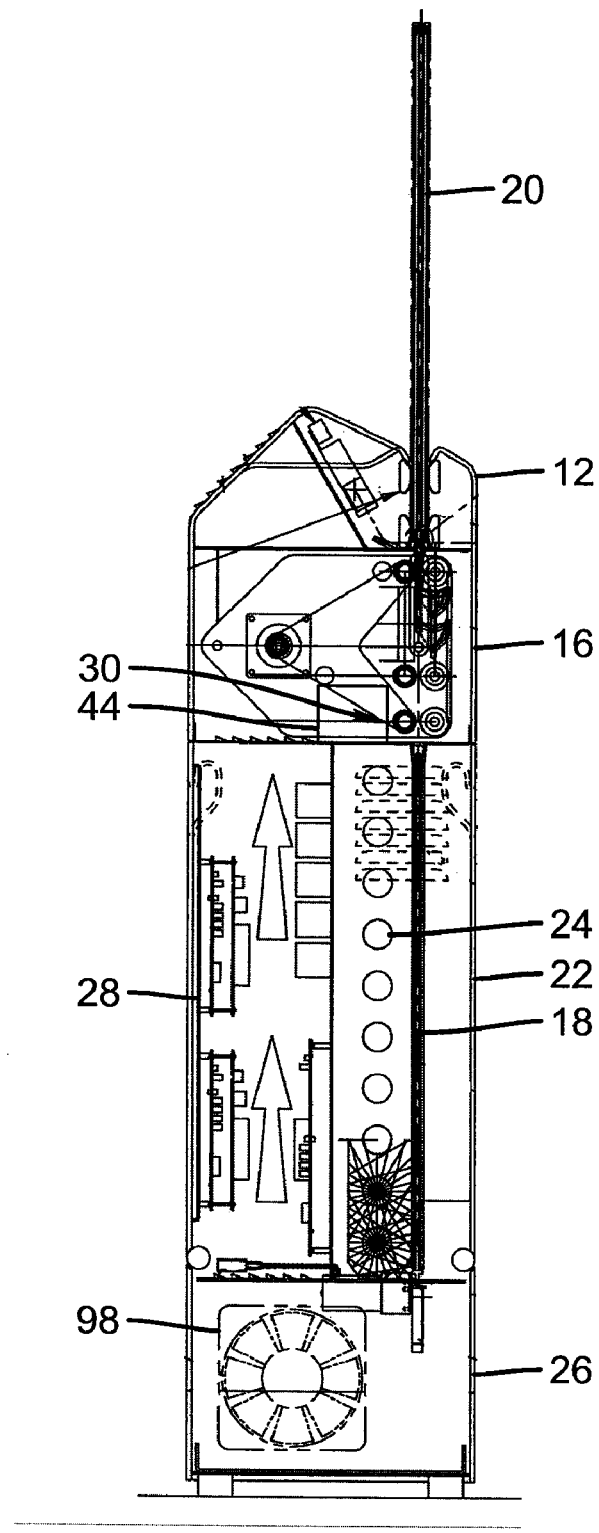
FIG. 2 is a side view of the radiation image data reading apparatus showing internal subsystems and components.

The side view of FIG. 2 shows internal subsystems of radiation data reading apparatus 10, including a substantially vertical transport path that a rigid or semi-rigid stimulable phosphor sheet 18 follows from cassette loading section 12 through portions of chassis 14.

The internal subsystems include a scanning section 16, a transport section 30, and an erase section 22. Scanning section 16 includes optics, stimulating radiation, and detector components for obtaining the image stored on stimulable phosphor sheet 18. Transport section 30, which can be actuated by one or more drive motor(s) 44, guides stimulable phosphor sheet 18 past scanning section 16 and into erase section 22. Erase section 22 includes one or more erasure radiation sources 24, typically arranged as a bank of lights, as shown in FIG. 2. Transport section 30 is mechanically coupled to scanning section 16 and cooperates with scanning section 16 to provide precision registration to move stimulable phosphor sheet 18.

A power supply 26 and control electronics section 28 provide the power and control signals needed to obtain the image and handle the scanning, erasure, and return of stimulable phosphor sheet 18 into cassette 20. Arrows in FIG. 2 indicate the flow of cooling air provided by a fan 98.

Figure 3:
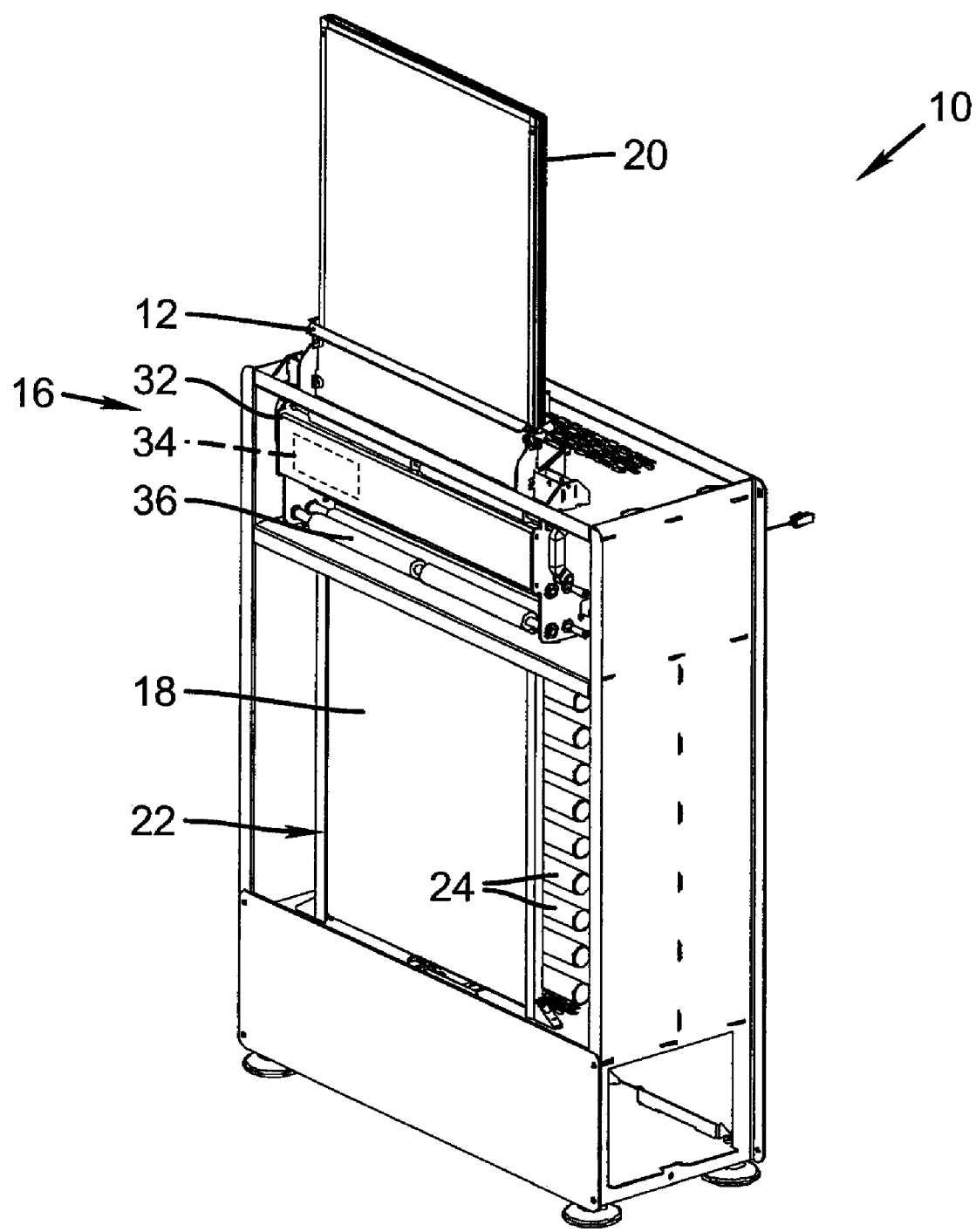
FIG. 3 is a perspective view of the radiation image data reading apparatus with cover removed.

FIG. 3 shows a perspective view, with portions of chassis 14 removed to illustrate underlying parts of radiation data reading apparatus 10, including scanning section 16. Scanning section 16 includes a scan housing 32 that encloses an optical scanning apparatus 34, indicated in dotted outline in FIG. 3, and supports components of transport section 30, as described subsequently.

Optical scanning apparatus 34 are known to those skilled in the art, and can be, for example, a flying-spot scanner that directs a scanned laser light onto stimulable phosphor sheet 18 as an excitation light, then reads the excited light that results to obtain the previously stored image therefrom. Optionally, optical scanning apparatus 34 can be a swath scanning apparatus that uses an excitation source and a photosensor array for obtaining the stored image, one horizontal swath at a time. The apparatus of the present invention is well-suited to operation with a number of optical scanning components that direct excitation energy of a first wavelength onto the phosphor sheet 18 and obtain phosphorescent light excited thereby, as is well known to those skilled in the digital radiographic imaging arts.

FIG. 3 also shows a transport roller 36 that is part of transport section 30 and is used, in conjunction with other components as described subsequently, to move stimulable phosphor sheet 18 through scanning section 16 and, following scanning, into erase section 22.

Figure 4:
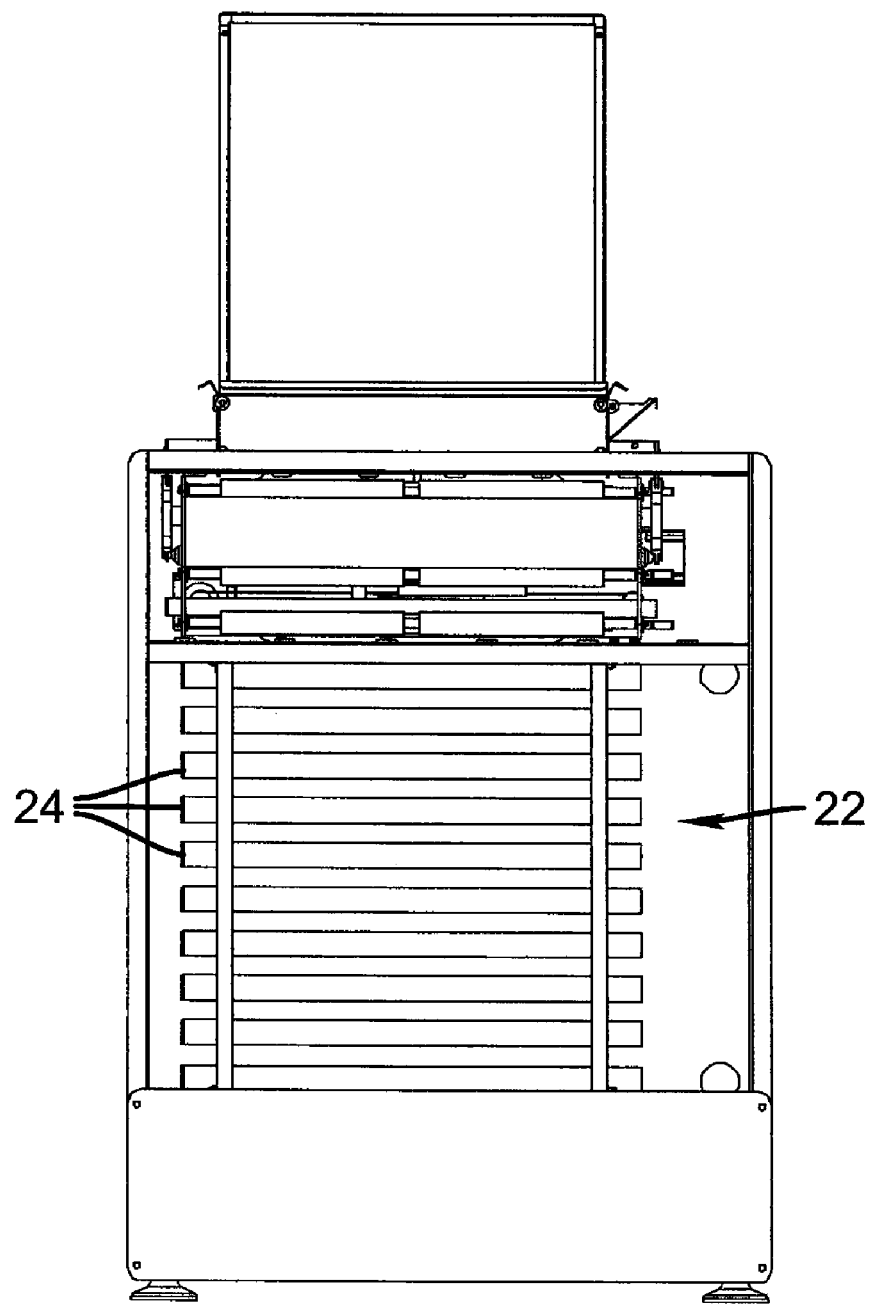
FIG. 4 is a front view of the radiation image data reading apparatus components.

In an embodiment shown in FIG. 4, erase section 22 includes a bank of erasure radiation sources, such as would be provided by standard fluorescent lamps, for example a DULUX™ type bulb from Osram Sylvania, Danvers, Mass.

Figure 5:
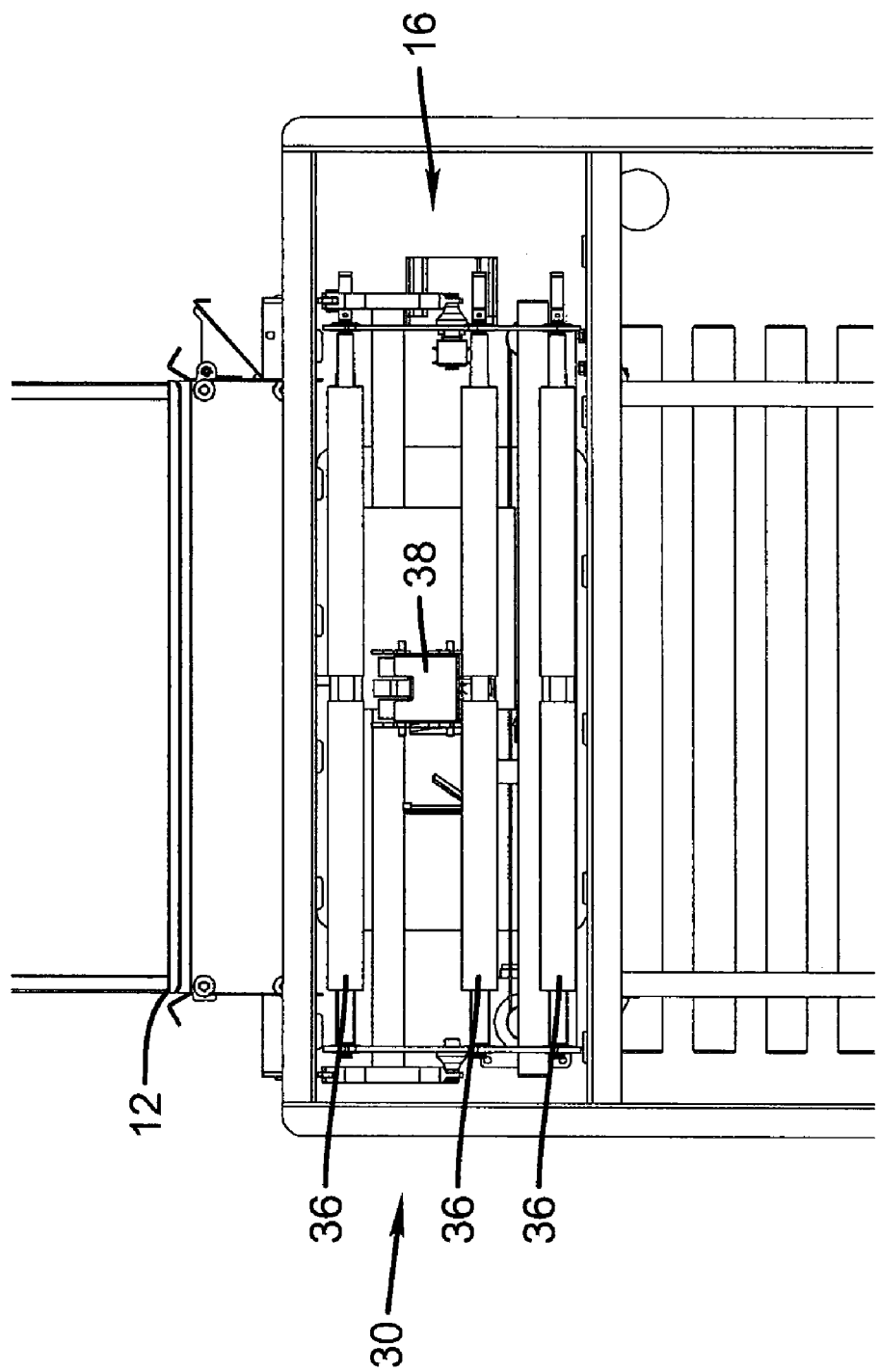
FIG. 5 is a close up view showing key components of the transport section and its associated scanning section.
Figure 6:
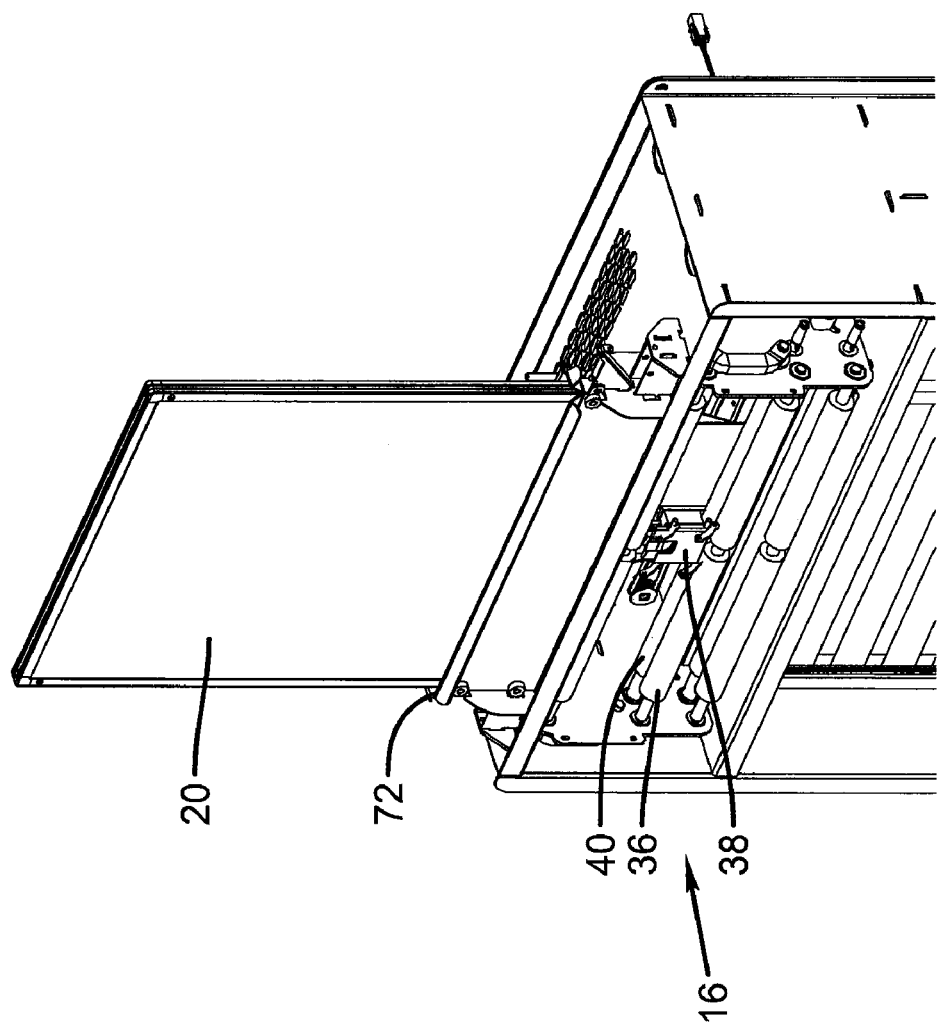
FIG. 6 is a perspective view showing cassette handling components.

The view of FIG. 5 and rear perspective view of FIG. 6 show transport section 30. In this embodiment, three pairs of opposing rollers 36 are used for guiding stimulable phosphor sheet 18 through radiation data reading apparatus 10, each pair of rollers 36 forming a nip 40. With this arrangement, stimulable phosphor sheet 18 is stably secured between at least two nips 40 while it is being scanned. Rollers 36 are attached to scan housing 32, thereby providing registration along the optical axis (conventionally described as the z axis direction).

FIGS. 5 and 6 also show the position of a sheet return member 38 in one embodiment. Sheet return member 38 is actuated upon return of stimulable phosphor sheet 18 into cassette 20, in the cassette reloading sequence described subsequently.

Sheet Transport Sequence

Figure 7:
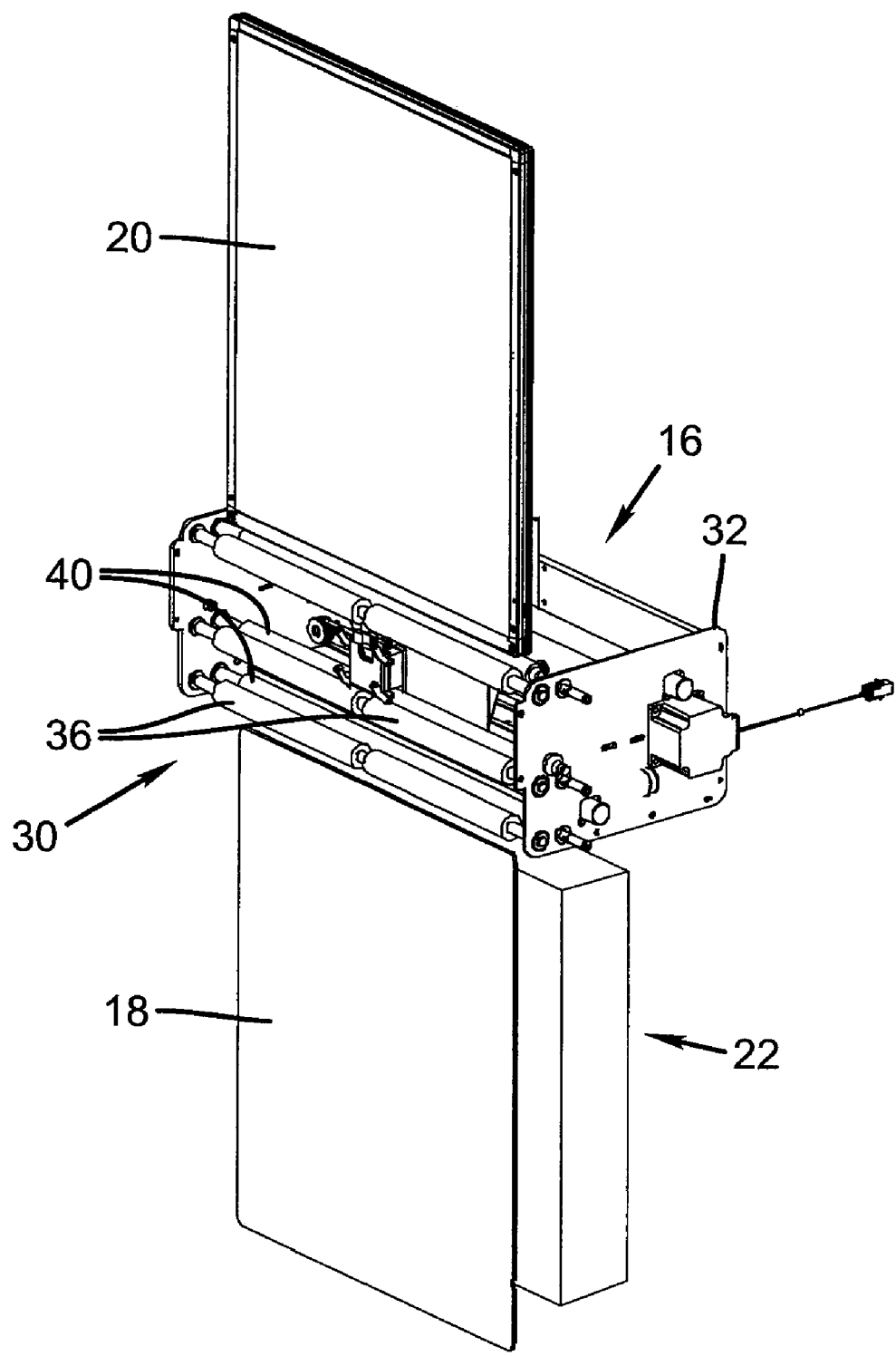
FIG. 7 is a perspective view showing the substantially vertical transport path for the stimulable phosphor sheet.
Figure 8:
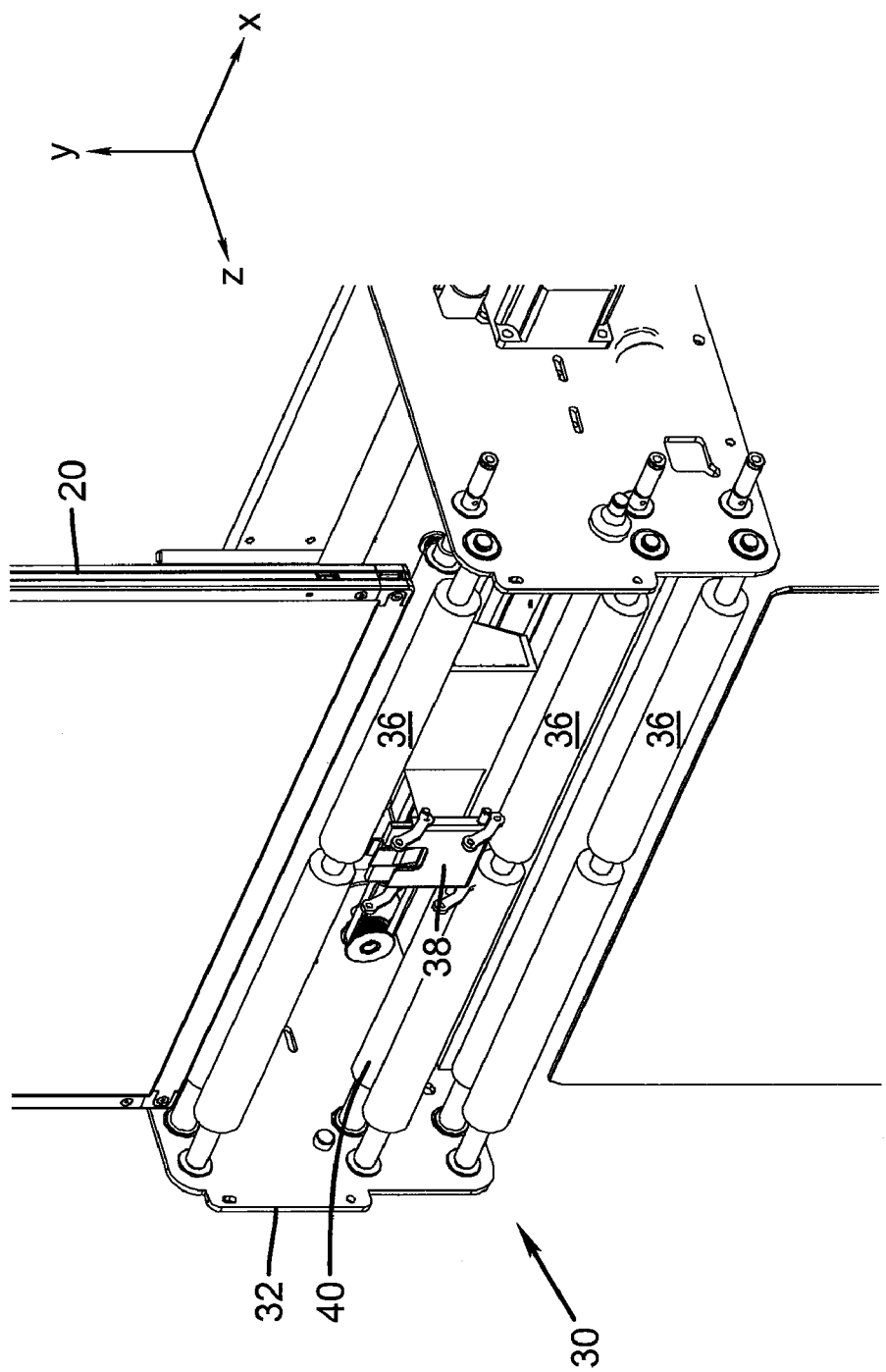
FIG. 8 is a close-up perspective view of transport section components.

The perspective view of FIGS. 7 and 8 show scanning section 16 with rollers 36 from transport section 30 mounted onto scan housing 32. This arrangement provides registration along the optical axis, shown as the z axis using the coordinate axes assignment of FIG. 8. The y axis is vertical, the x axis horizontal using this conventional axis assignment. The sequence given in FIGS. 9A through 9F shows how these components cooperate to transport stimulable phosphor sheet 18 along the vertical y axis through scanning section 16 and erase section 22. Stimulable phosphor sheet 18 is shown in dotted outline where it is hidden from view.

Figure 9A:
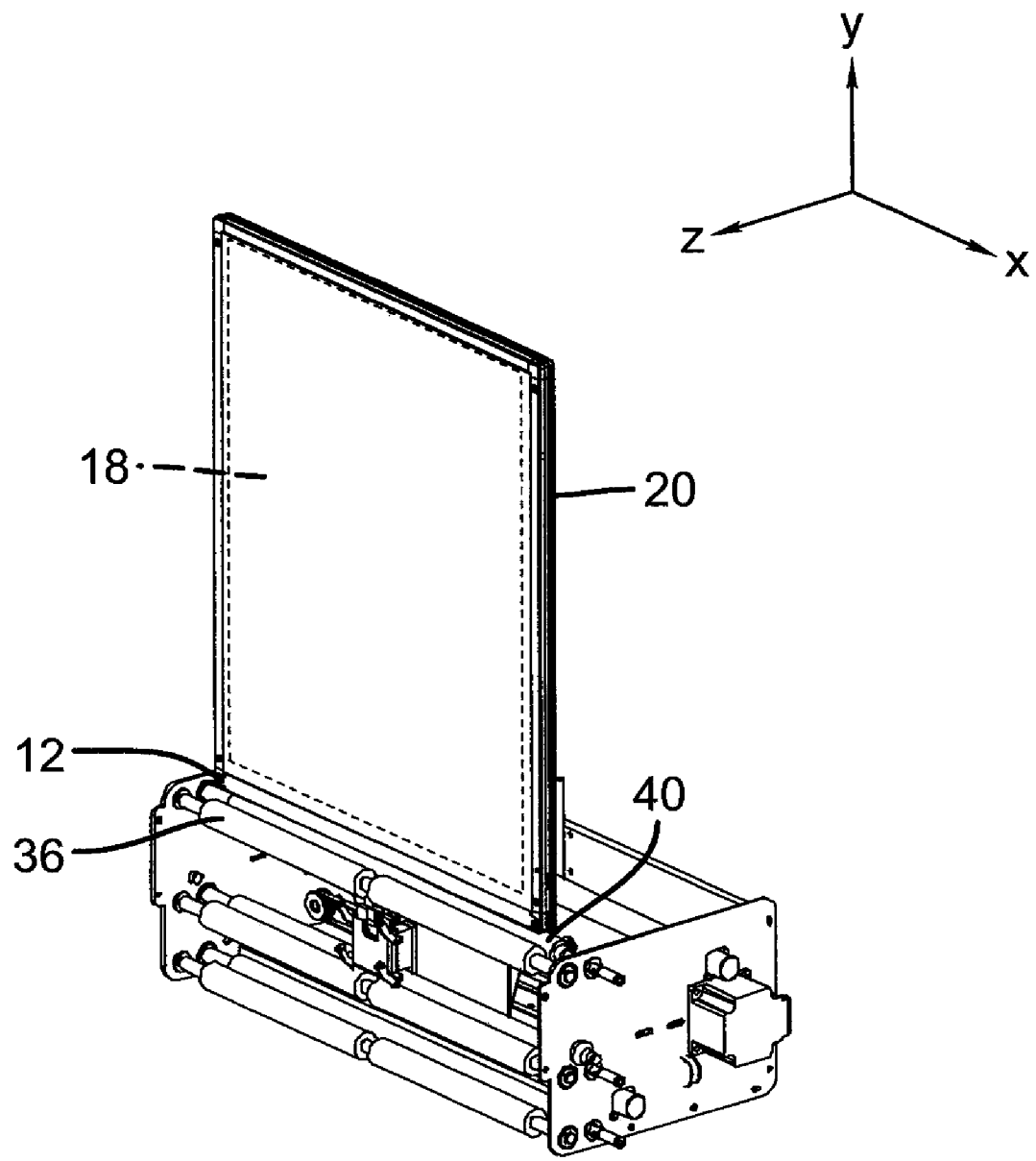
FIGS. 9A through 9F show the sequence of handling for the stimulable phosphor sheet.

FIG. 9A shows stimulable phosphor sheet 18 housed in cassette 20 as cassette 20 is received in cassette loading section 12. Components of cassette loading section 12, described subsequently, release stimulable phosphor sheet 18 from cassette 20 when cassette 20 is received in cassette loading section 12. Nip 40 of the first set of rollers 36 receives the leading edge of the released stimulable phosphor sheet 18 as it is removed from cassette 20. In one embodiment, control electronics section 28 (FIG. 2) detects this leading edge and actuates one or more drive motors 44 to turn rollers 36 for transporting stimulable phosphor sheet 18. In another embodiment, components of cassette loading section 12, as described subsequently, actuate a drive motor when cassette 20 is received in position in cassette loading section 12.

Figure 9B:
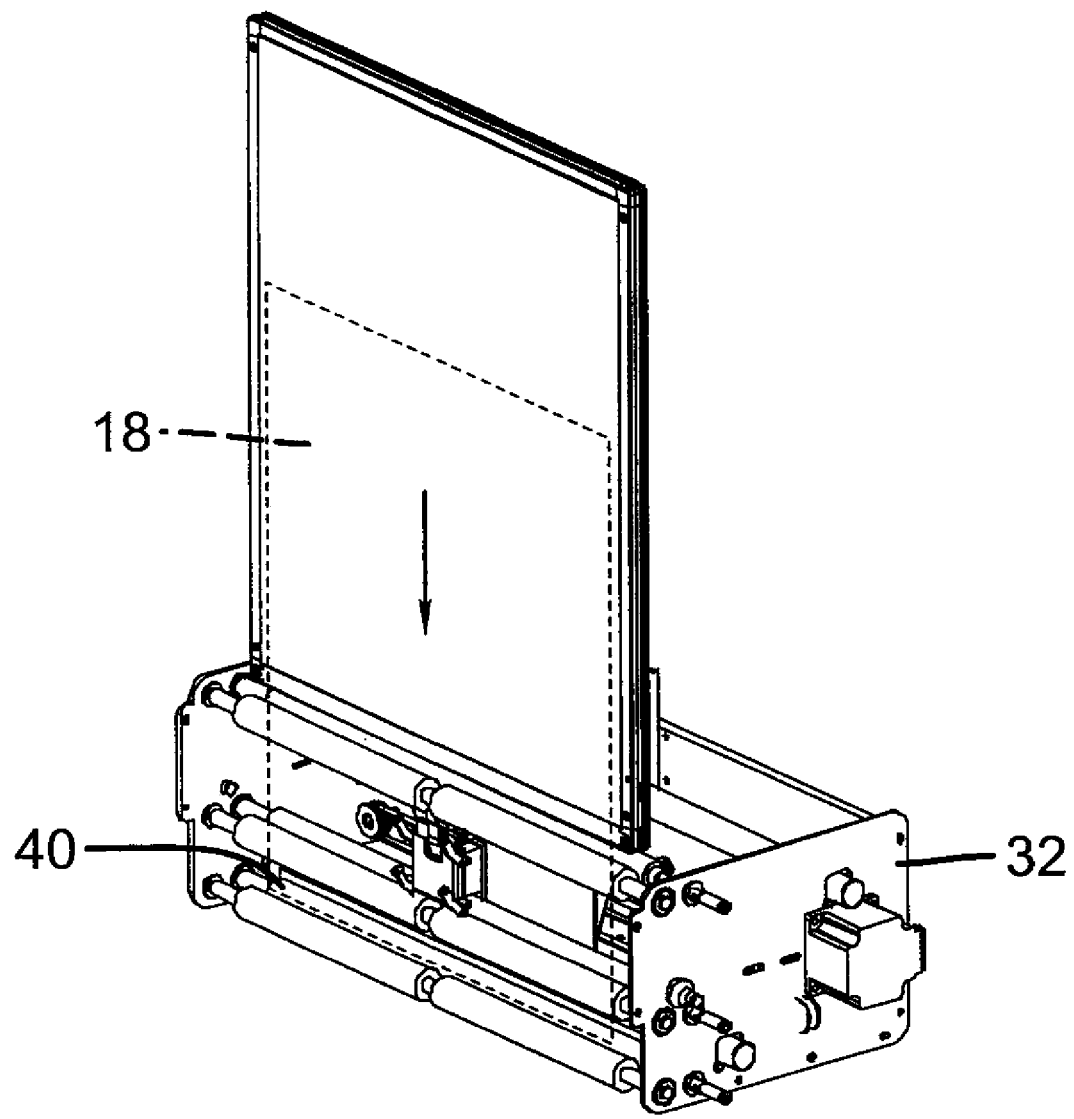

Referring next to FIG. 9B, scanning begins when stimulable phosphor sheet 18 has reached a scan position, for example, when sheet 18 reaches the second nip 40. In this arrangement, stimulable phosphor sheet 18 is positioned between at least two nips 40, and scan housing 32 is registered to stimulable phosphor sheet 18. As such, a portion of sheet 18 (adjacent the leading edge of the stimulable phosphor sheet) is not used for image storage but rather serves to facilitate handling of the sheet. In one embodiment, for example, the non-imaged lead edge portion of stimulable phosphor sheet 18 is nominally about 0.5 inches, preferably at least more than about 0.25 inches in length.

Figure 9C:
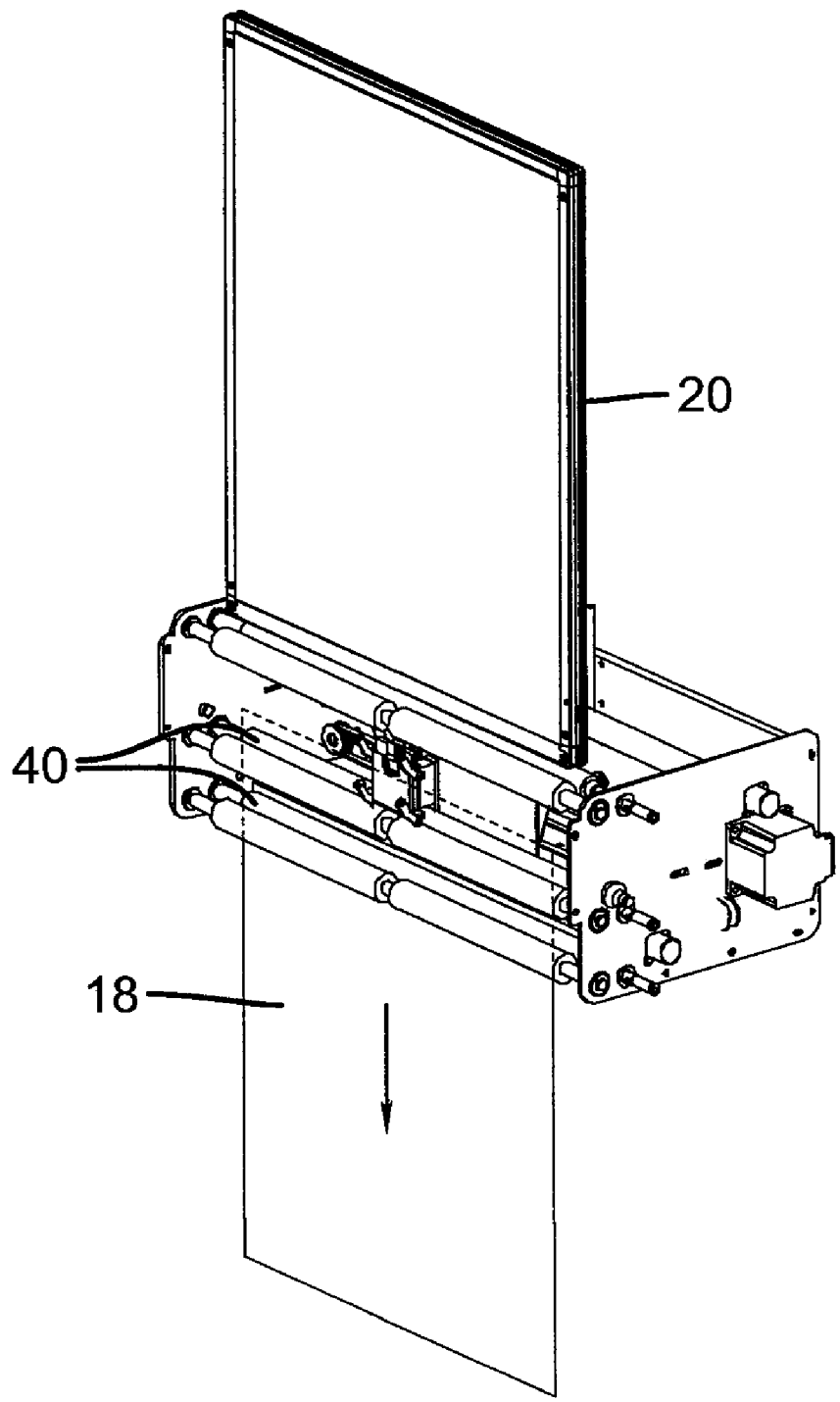
Figure 9D:
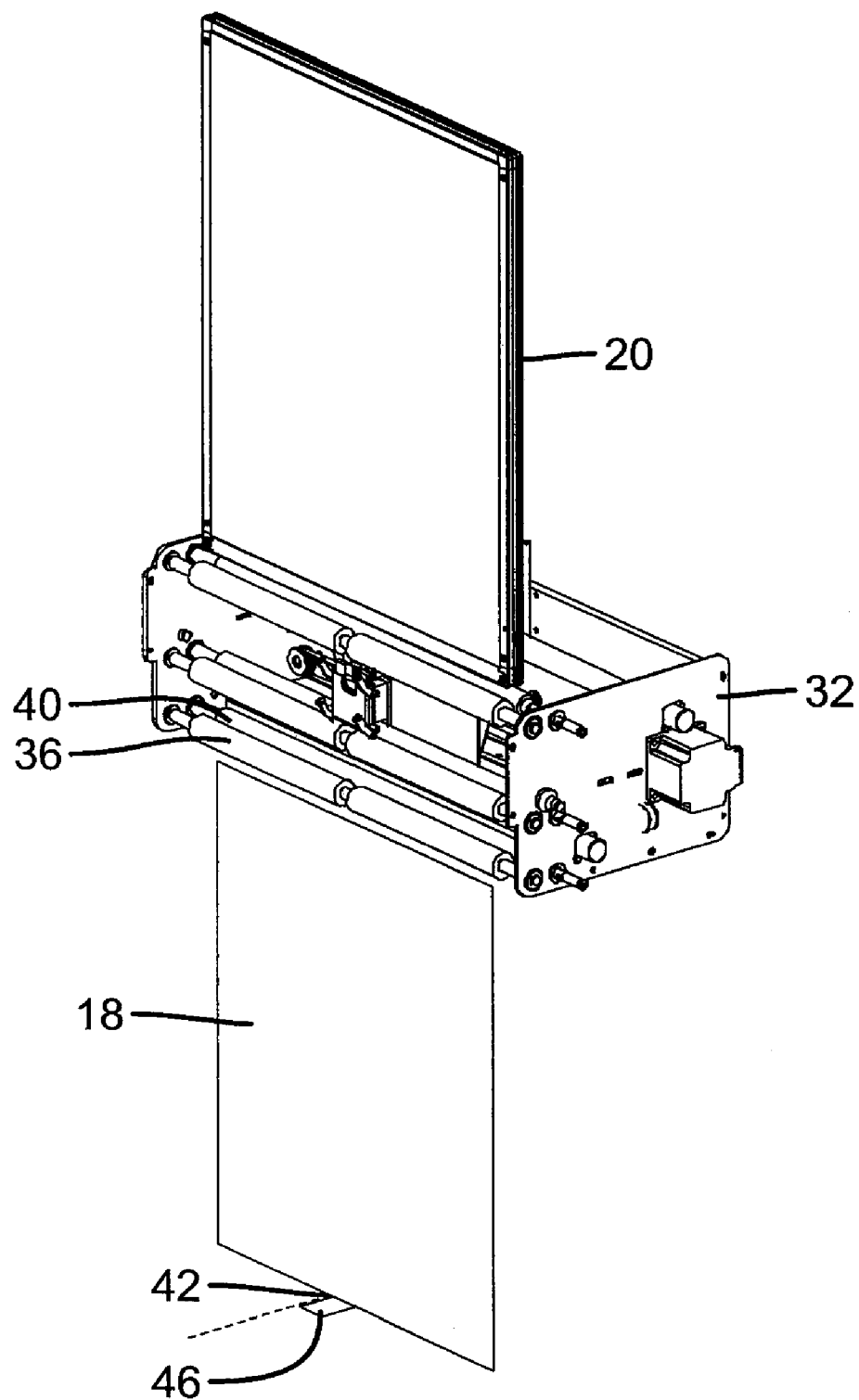

FIG. 9C shows stimulable phosphor sheet 18 at a position near the end of scanning. The sheet can be accurately scanned when held between two nips 40 as shown. As shown in FIG. 9D, stimulable phosphor sheet 18 reaches an end point 42 of travel, indicated along a dotted line in this figure. At this stage of processing, stimulable phosphor sheet 18 is within erase section 22 as was shown in FIGS. 2 through 4, and erasure of the sheet can be conducted. After erase exposure is completed, an urging mechanism 46 is actuated, wherein the direction of stimulable phosphor sheet 18 is reversed and sheet 18 is moved into nip 40 of the lower set of rollers 36. Motor 44, or its supporting gear mechanism (not shown), reverses the direction of rollers 36. Urging mechanism 46 can be a cam-actuated arm in one embodiment or alternately a solenoid or other actuator known to those skilled in the art.

Figure 18:
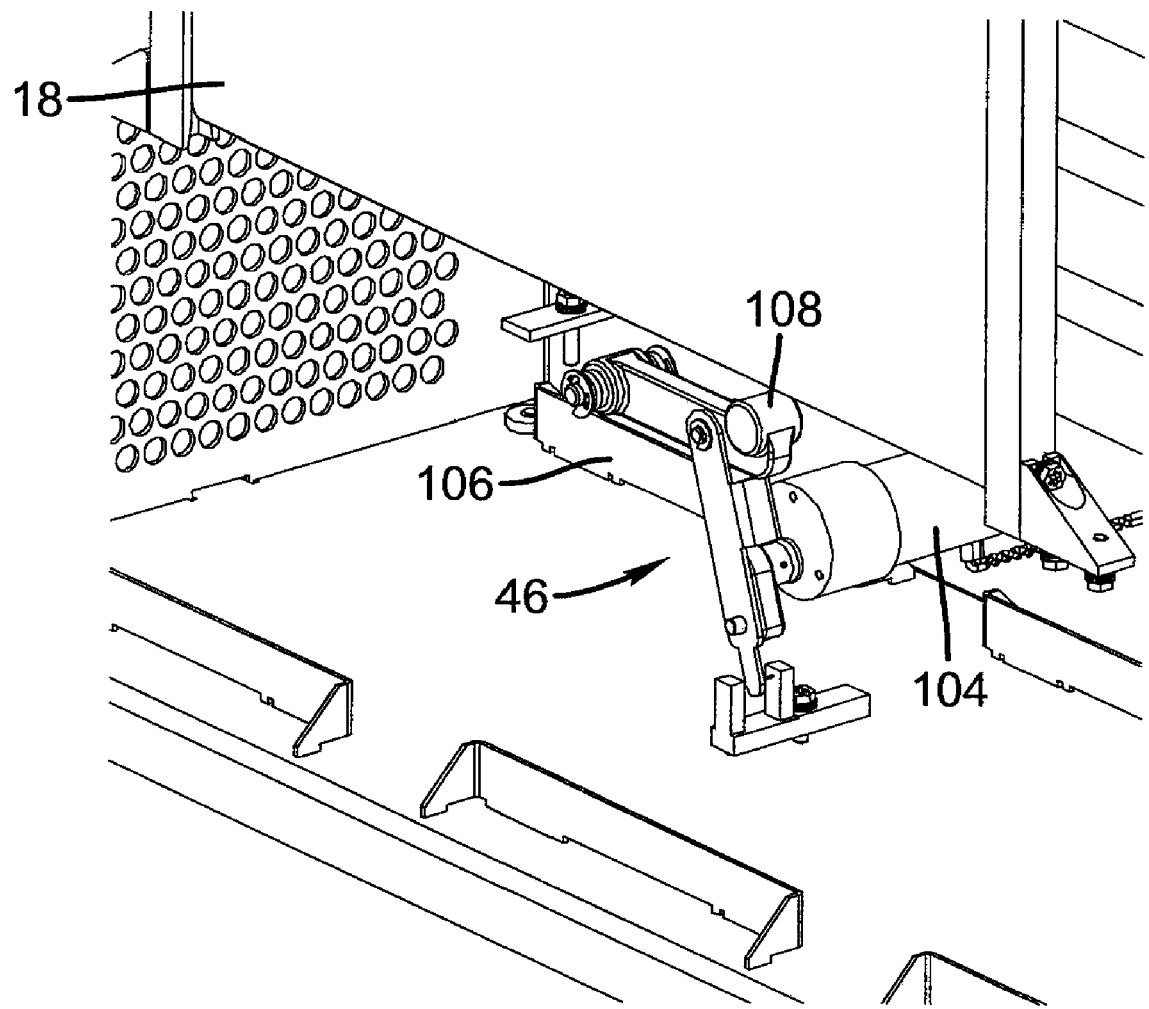
FIG. 18 is a close-up perspective view of an urging mechanism for reversing sheet direction according to one embodiment.

Urging mechanism 46 can be configured to align sheet 18 toward a plane substantially parallel to reference edge 72. As such, when sheet 18 is inserted into cassette 20 (during reinsertion), sheet 18 is urged toward reference edge 72. For example, as shown in FIG. 18, lifting arm 108 can be an urging-surface which moves along the x-axis edge of sheet 18 toward the plane substantially parallel to reference edge 72 thereby causing sheet 18 to slightly pivot and translate in the x-direction toward the plane substantially parallel to reference edge 72.

Figure 9E:
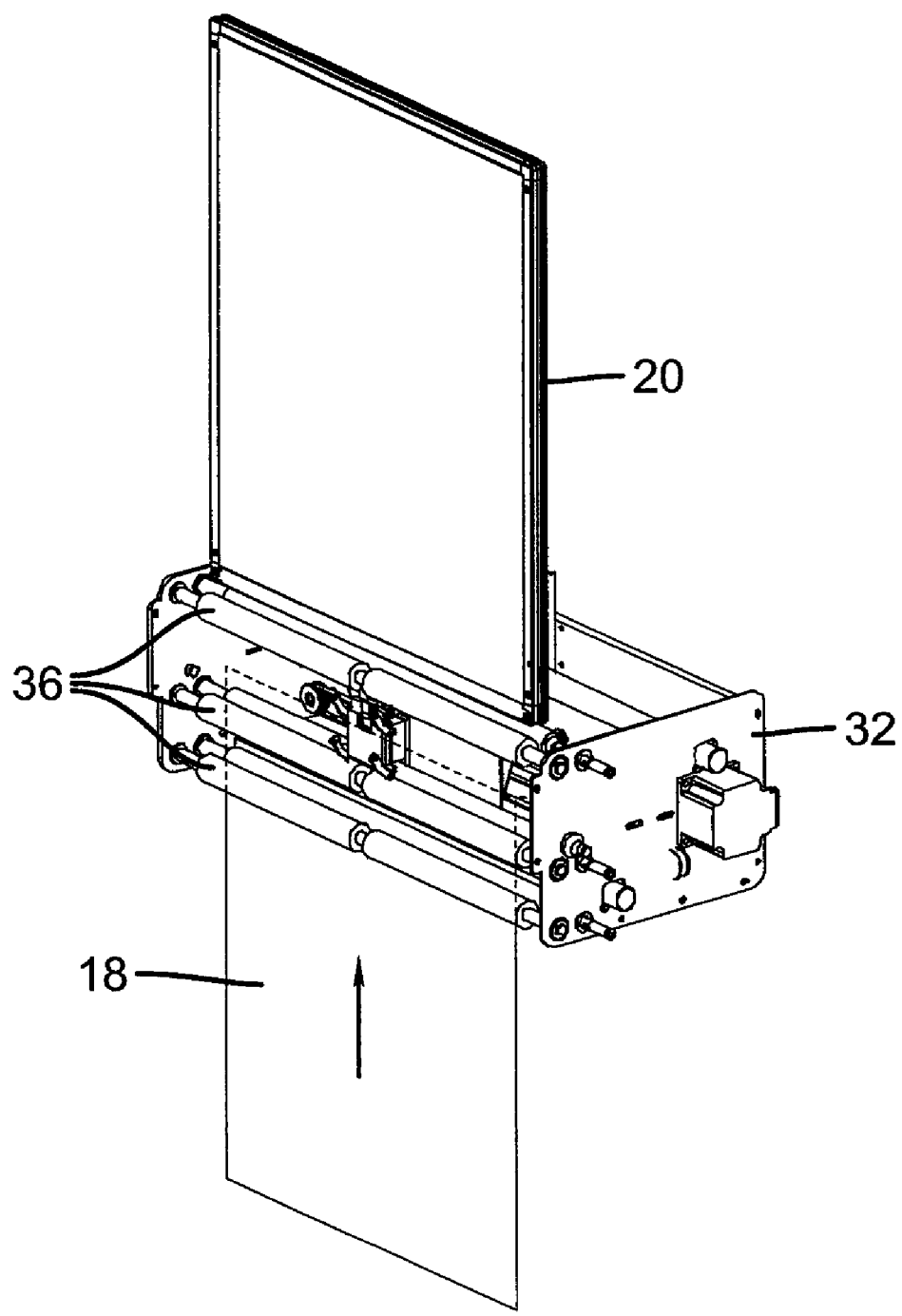
Figure 9F:
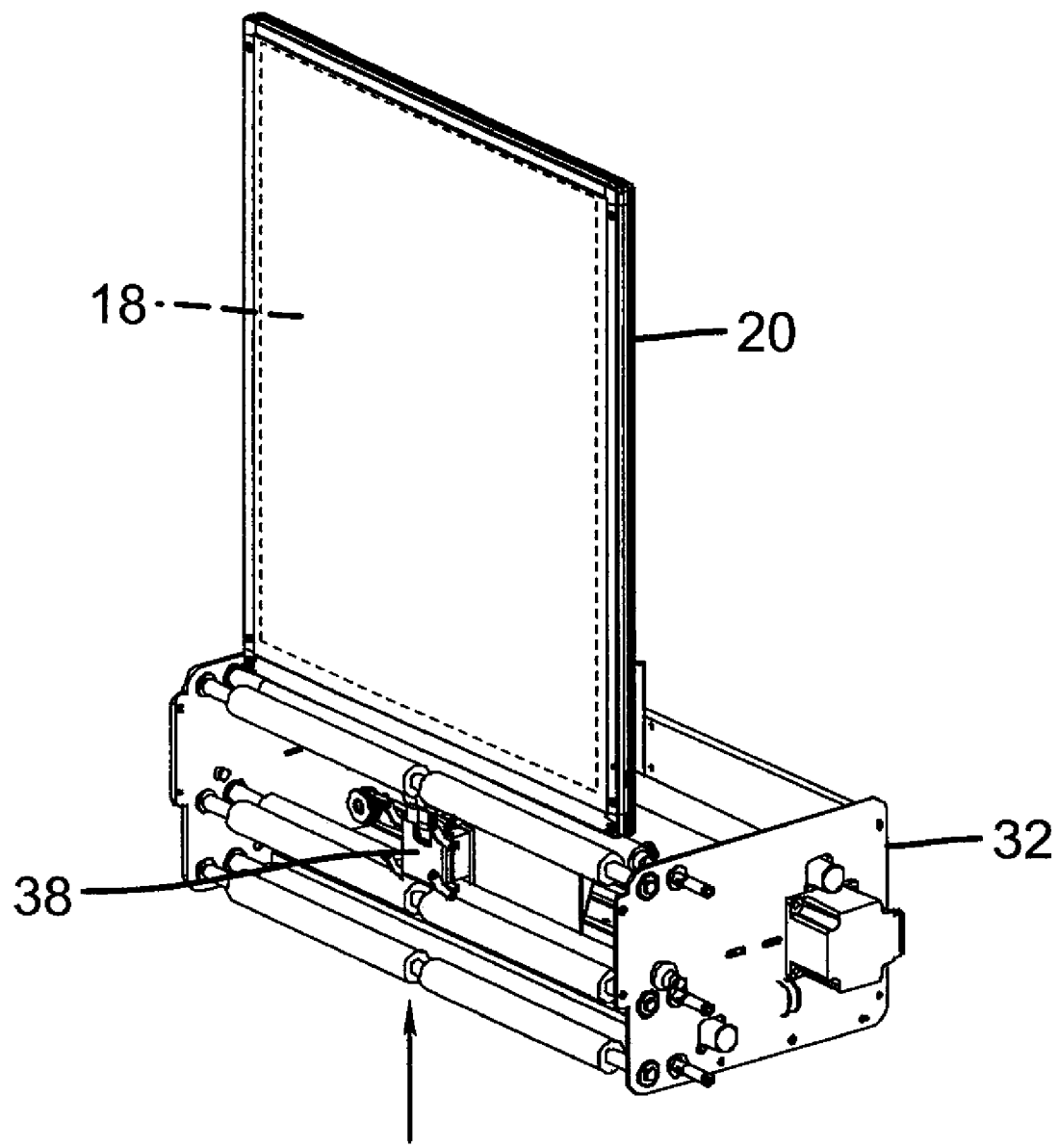

FIG. 9E shows stimulable phosphor sheet 18 moving through rollers 36 and into cassette 20. Edge guidance can be provided for guiding side edges of stimulable phosphor sheet 18 along its return path to promote sheet reinsertion into cassette 20 without binding or obstruction. FIG. 9F shows completion of the reinsertion sequence. Sheet return member 38 actuates to urge stimulable phosphor sheet 18 into cassette 20. Once the sheet is returned to the cassette, a latch mechanism can be engaged to secure the sheet within the cassette, as is described subsequently.

As was described with reference to FIG. 2, control electronics section 28 can provide the control logic and drive signals that coordinate movement of stimulable phosphor sheet 18 along its transport path. A minimum number of sensors are needed to detect conditions such as end of travel, presence within at least two nips 40, and other events, as would be familiar to one skilled in the motion control arts.

Rollers 36 can be conventional paired rollers, for example, with rubber and foam rollers paired to form nip 40 which are preferably firm but not overly rigid. The rollers are employed to hold stimulable phosphor sheet 18 firmly, without causing it to fold, bend, or become warped.

Figure 14A:
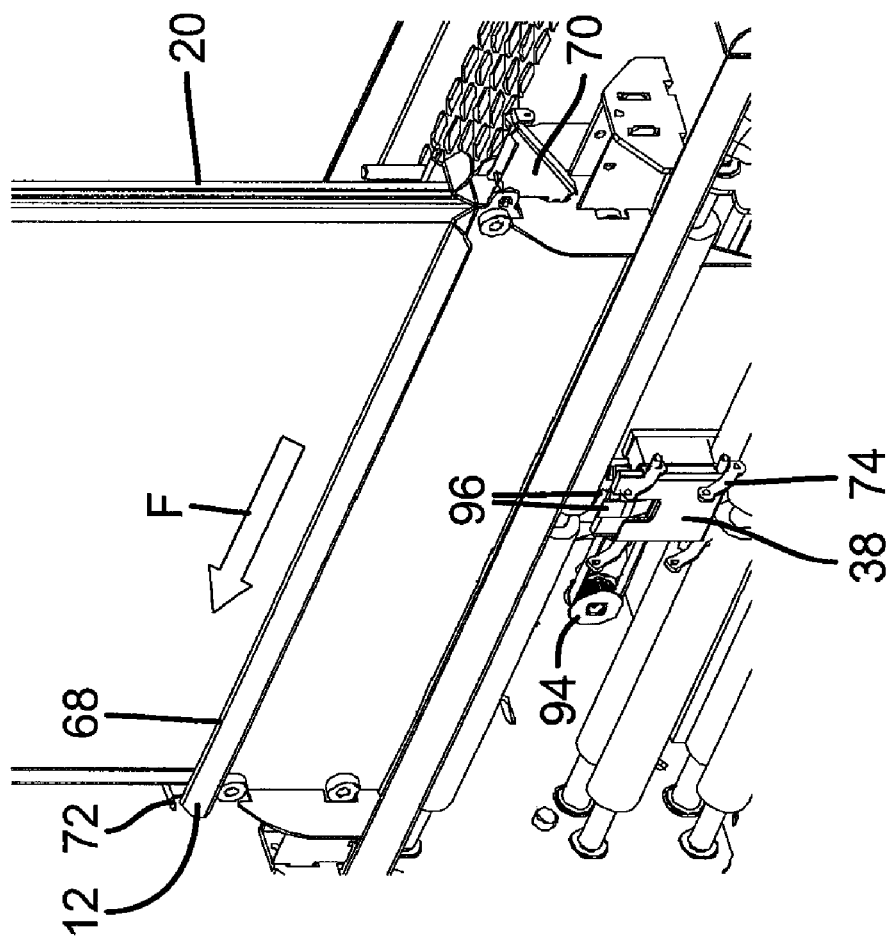
FIG. 14A is a close-up perspective view showing the cassette sheet return mechanism.
Figure 14B:
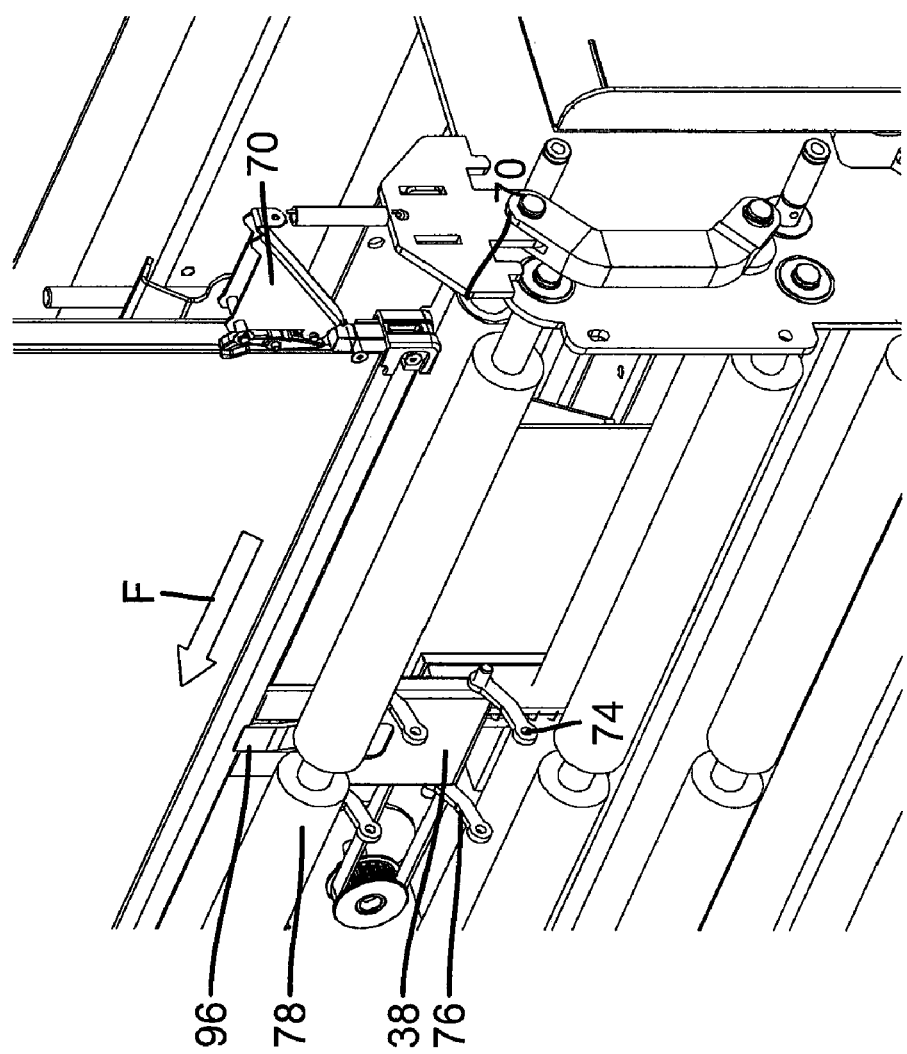
FIG. 14B is a close-up perspective view showing the cassette sheet return mechanism at one stage of actuation.
Figure 14C:
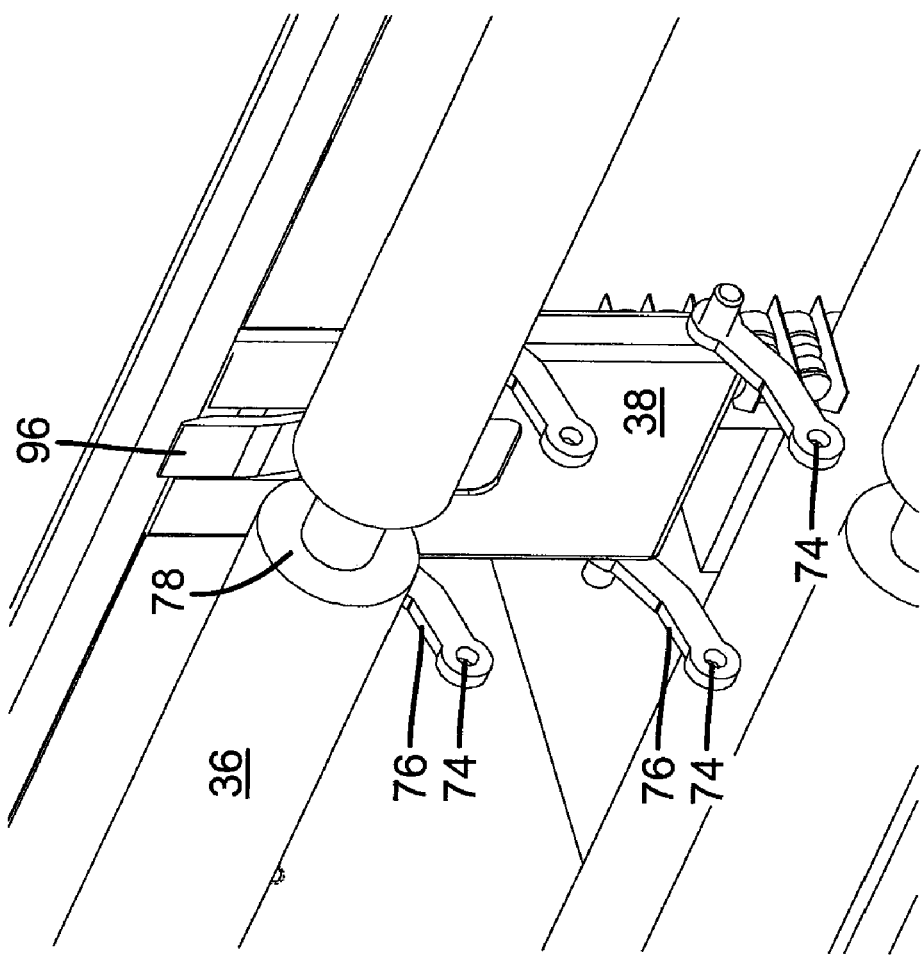
FIG. 14C is a close-up perspective view showing sheet return member 38 and support components when actuated.
Figure 14D:
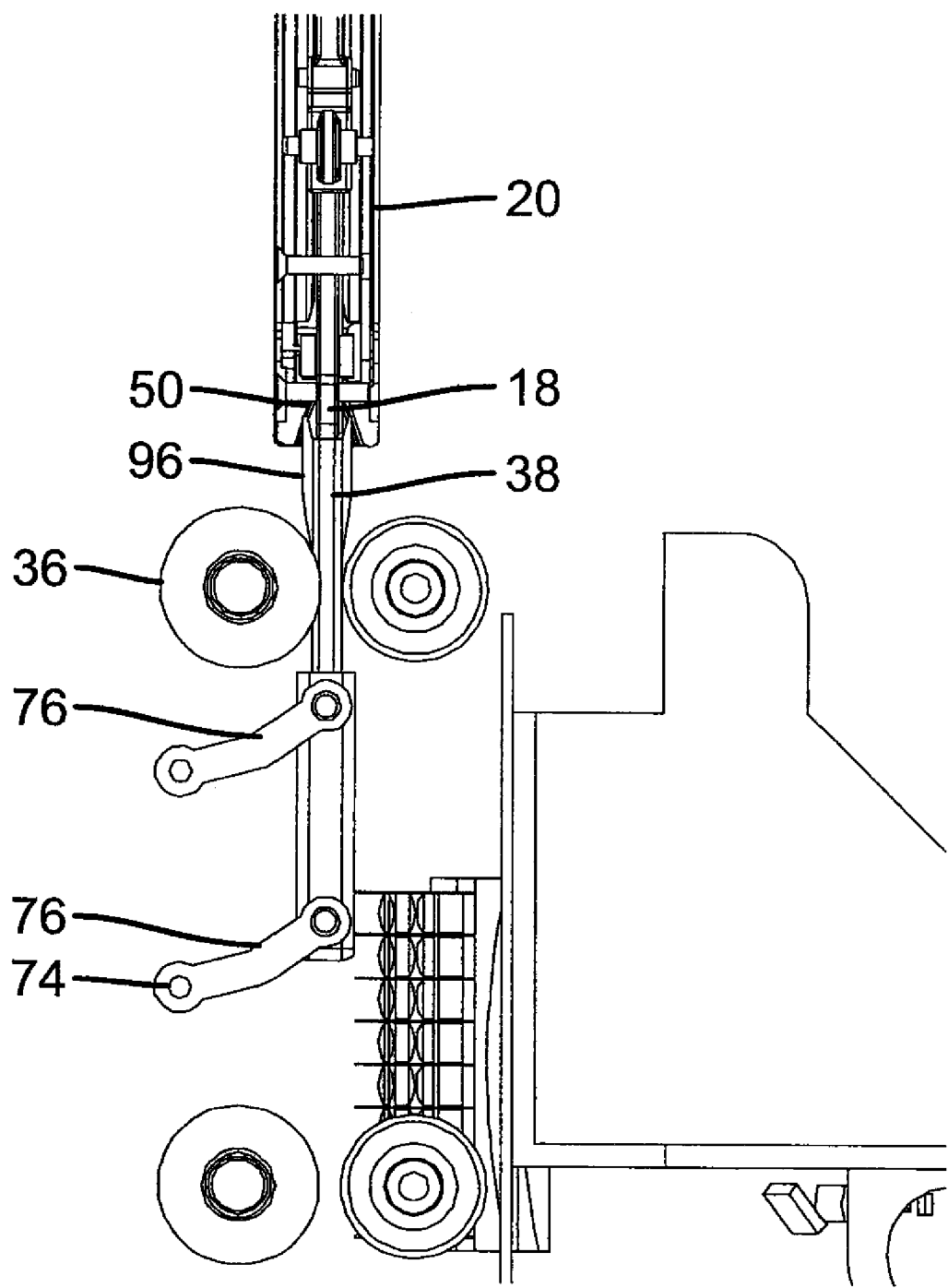
FIG. 14D is a close-up side view showing sheet return member 38 and support components when actuated.

FIGS. 14A through 14D show an embodiment of sheet return member 38. FIG. 14A shows sheet return member 38 in a resting or unused position. Upon sensing that stimulable phosphor sheet 18 is being reinserted into cassette 20, sheet return member 38 is actuated. The perspective views of FIGS. 14B and 14C and side view of FIG. 14D show sheet return member 38 in a actuated position. Members 96, shown as spread fingers 96, on sheet return member 38 are arranged to stabilize edge movement as sheet return member 38 urges the leading edge of stimulable phosphor sheet 18 upward toward cassette 20. A motor 94 and support hardware, such as pivoted lifting arms 76 having pivot points 74 (as shown in FIGS. 14A-14D), cooperate to move sheet return member 38 upward. A gap 78 in upper roller 36 allows unobstructed travel of sheet return member 38 past transport components.

In moving stimulable phosphor sheet 18 into an opening 50 of cassette 20, sheet return member 38 re-engages the restraint/latch mechanism that secures stimulable phosphor sheet 18 within cassette 20, as described in more detail subsequently.

It is noted that sheet return member 38 can force cassette 20 slightly but noticeably out of position in cassette loading section 12, so that an operator can visually ascertain that scanning and reinsertion are completed.

Figure 10:
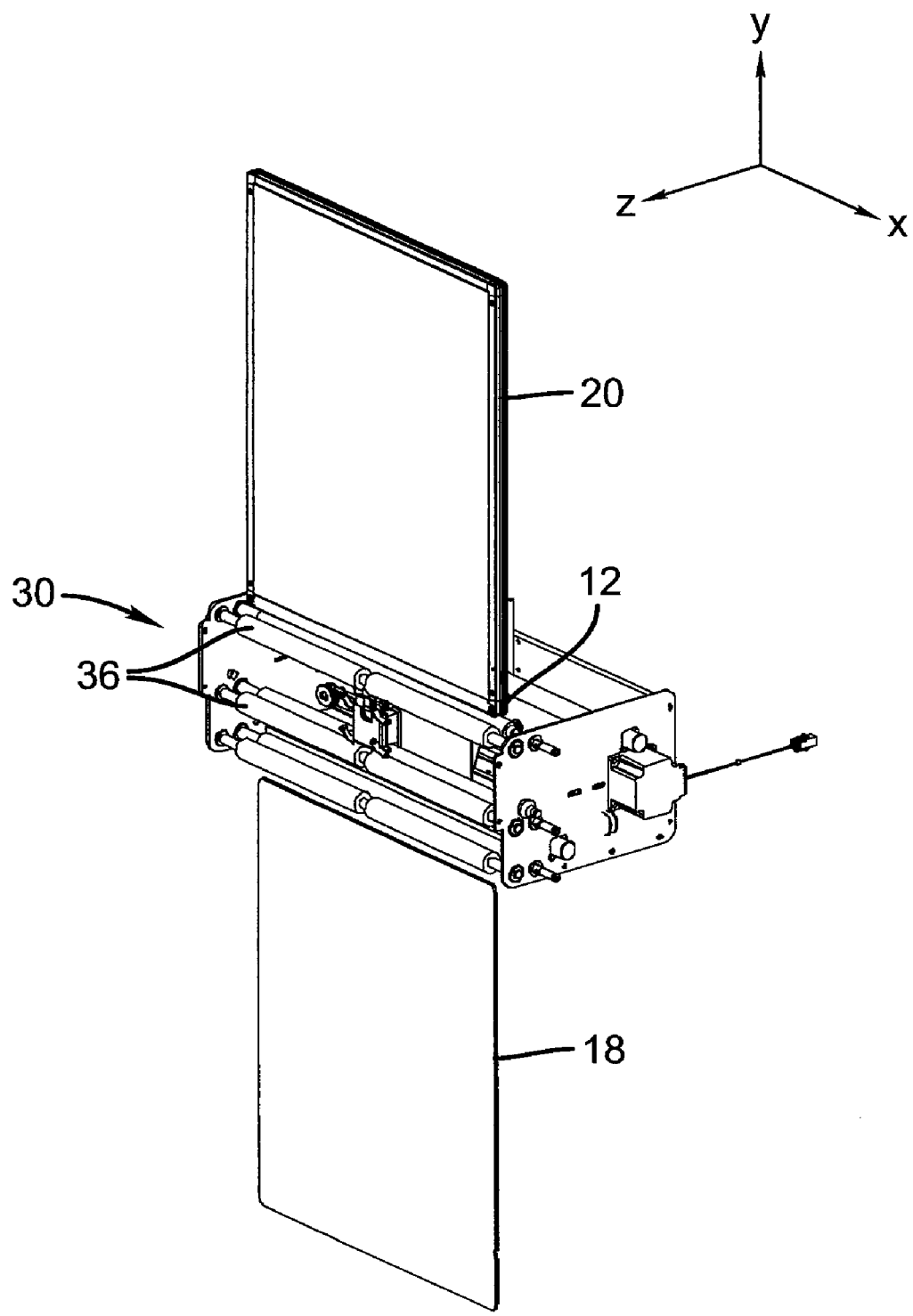
FIG. 10 shows edge registration along the transport path.
Figure 11:
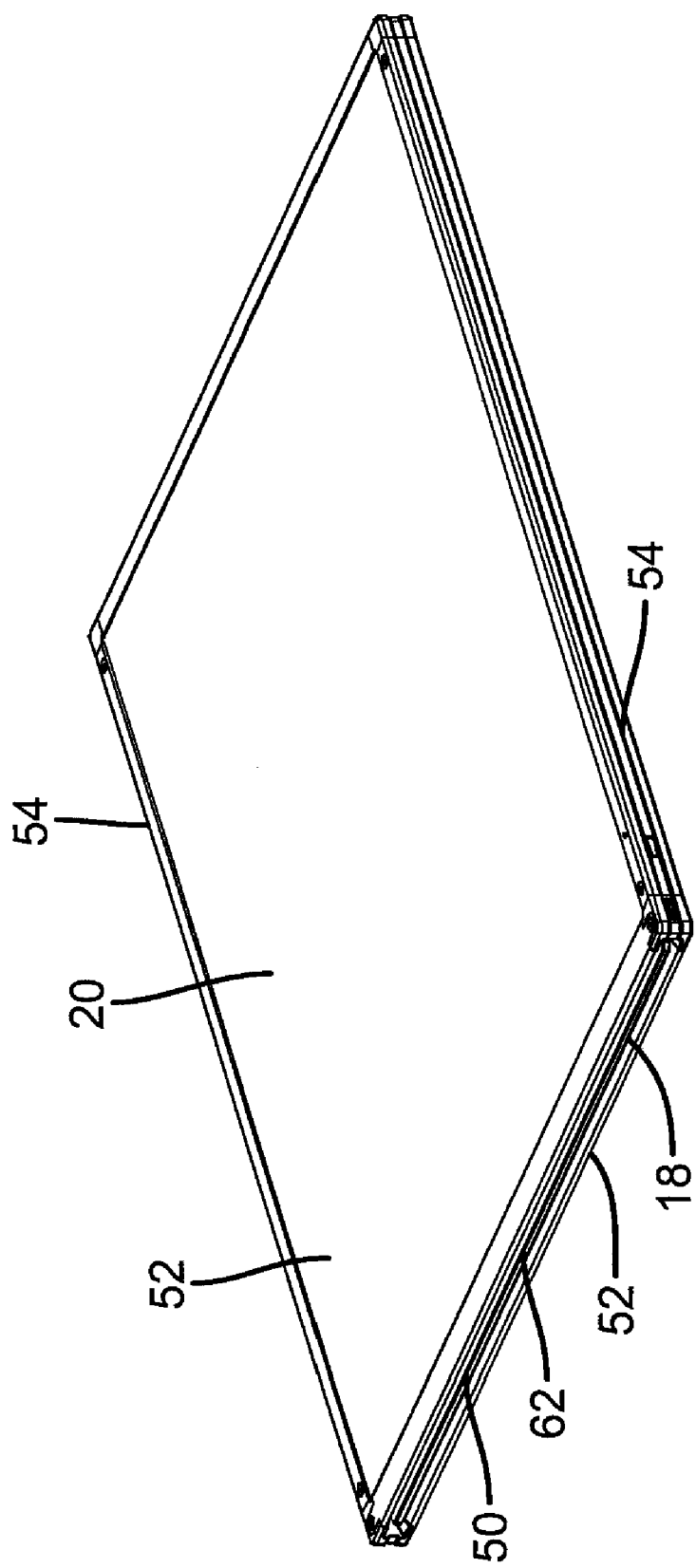
FIG. 11 is a perspective view showing the cassette.

By way of reference, FIG. 14B shows, using arrow F, the direction of force applied to cassette 20 to obtain edge registration, as described with regard to FIG. 10.

FIG. 18 more particularly illustrates urging mechanism 46 that reverses the movement direction of stimulable phosphor sheet 18 at the end of travel (end point 42 of FIG. 9D). For the arrangement shown in the figure, motor 104 actuates a lifting mechanism 106 that pushes a lifting arm 108 upward. It is noted that a minimal/small amount of upward movement is needed, since reversal of roller 36 direction in transport section 30, as described earlier, moves stimulable phosphor sheet 18 in the direction for reloading into cassette 20. A number of different lifting mechanisms 106 can be employed for this function, as will be well known to those skilled in the motion control arts.

Sheet Registration

As illustrated in FIGS. 9A through 9F, proper registration of stimulable phosphor sheet 18 and guidance along its transport path promotes accuracy of image scanning and provides the precision for automated reinsertion into cassette 20. The perspective view of FIG. 10 shows the transport path of stimulable phosphor sheet 18 with coordinate axes for reference. Rollers 36 cooperate to stabilize the position of stimulable phosphor sheet 18 with respect to the xy plane and set the proper z axis distance to scanning optics. Registration of the cassette and plate is accomplished using a single registration edge, as will be described below with reference to edge 72.

Cassette

Figure 12A:
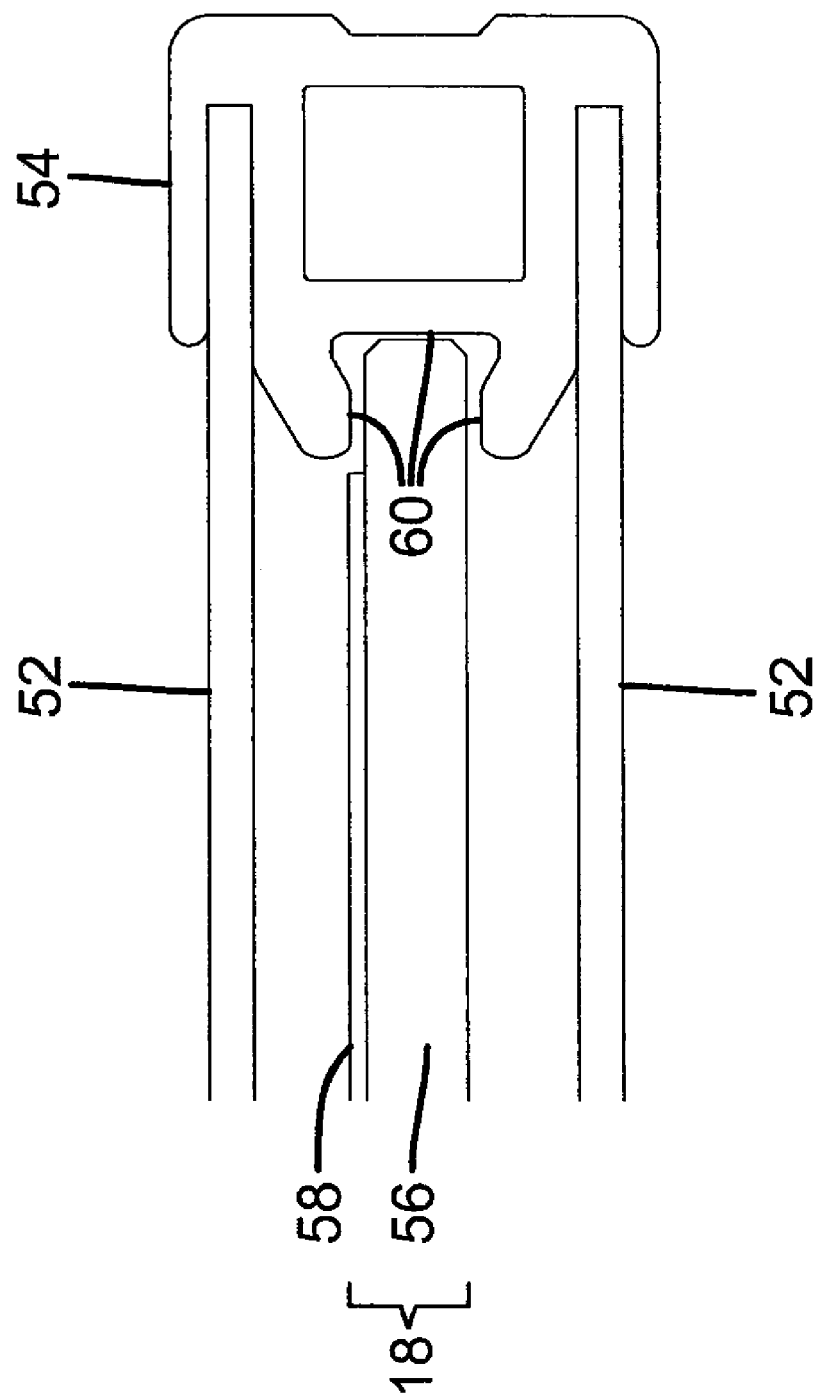
FIG. 12A is a cross sectional view of a portion of the cassette showing edge guidance features.
Figure 12B:
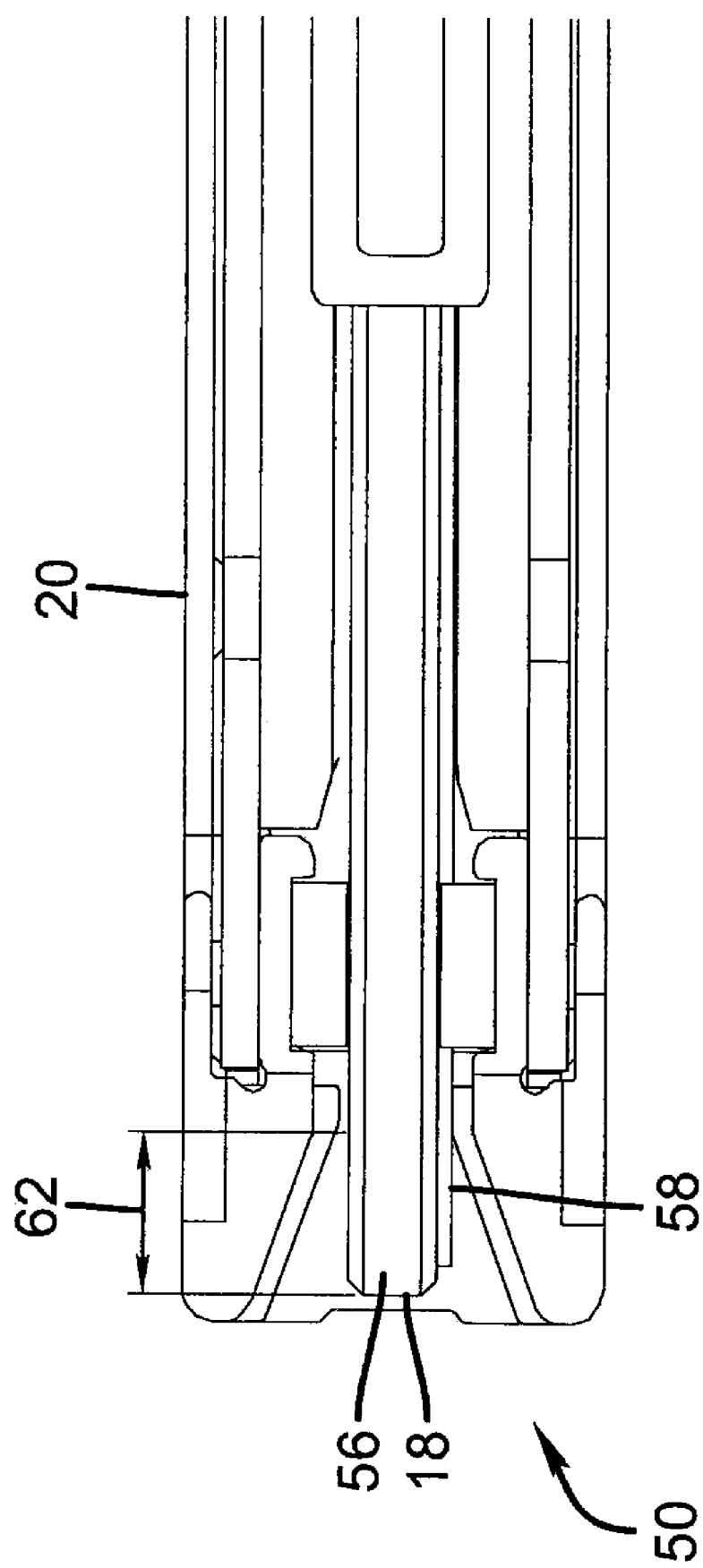
FIG. 12B is a cross sectional view, taken orthogonally with respect to FIG. 12A, showing the leading edge of the phosphor sheet in the cassette.

FIGS. 11, 12A, 12B, and 13 show particular features of cassette 20 relative to the scanning sequence described with reference to FIGS. 9A through 9F. Opening 50 exposes a lead edge 62 of stimulable phosphor sheet 18, as is best shown in FIG. 12B. Lead edge 62 provides a portion of stimulable phosphor sheet 18 that extends out from opening 50, beyond a light-protected region, and allows manipulation and guidance of stimulable phosphor sheet 18 through transport section 30, as described earlier. Lead edge 62 is a non-imaged area. That is, lead edge 62 is not considered as part of the "imageable" area of stimulable phosphor sheet 18; imageable portions are protected from ambient light by enclosure within the light-protected body of cassette 20.

To provide enclosure for stimulable phosphor sheet 18 that is substantially light-tight, cassette 20 has top and bottom covers 52. Left and right side extrusions 54 support covers 52 and have edge guide features 60, shown in transverse cross section in FIG. 12A, that can extend along the length of stimulable phosphor sheet 18. Stimulable phosphor sheet 18 itself includes a phosphor coating 58 on a plate 56. It is noted that a tolerance is accommodated between the edge of stimulable phosphor sheet 18 and edge guide features 60 on side extrusion 54.

Figure 13:
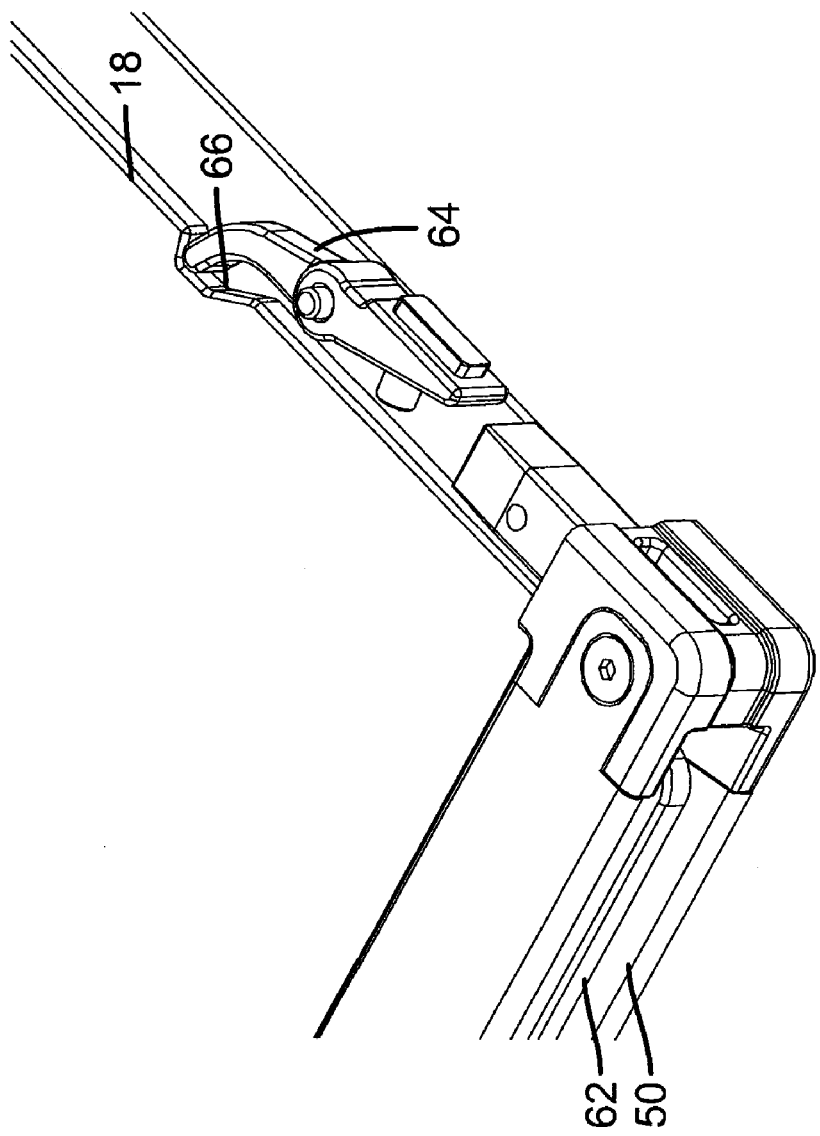
FIG. 13 is a close-up perspective view showing the cassette latching mechanism.

FIG. 13 shows an edge of cassette 20 with side extrusion 54 removed, to allow visibility of a restraining latch mechanism 64 used for securing in place or releasing stimulable phosphor sheet 18 within cassette 20. Mechanism 64 is one suitable type of restraint member and can be spring-held or otherwise forced inward to engage a notch/detent 66 along an edge of stimulable phosphor sheet 18. Other suitable mechanisms will be known to those skilled in the art.

Figure 19:
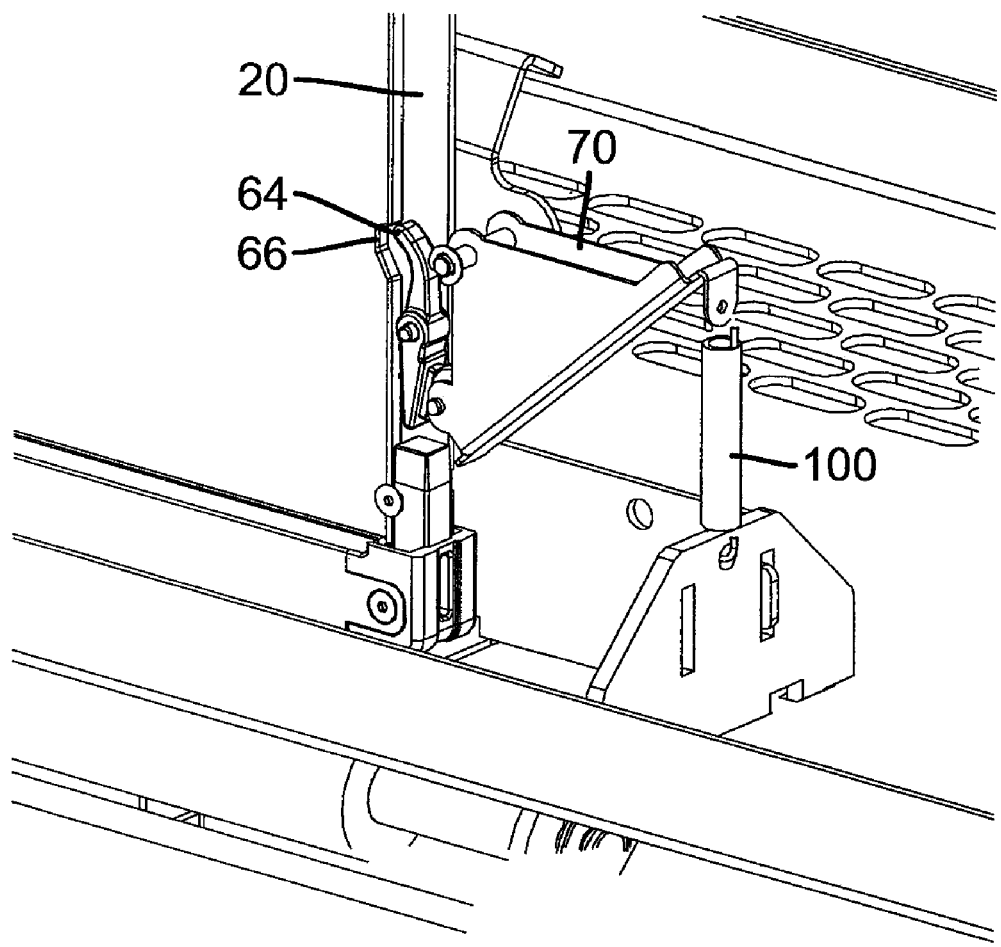
FIG. 19 is a close-up perspective view of a mechanism for sheet release from the cassette in one embodiment.
Figure 20:
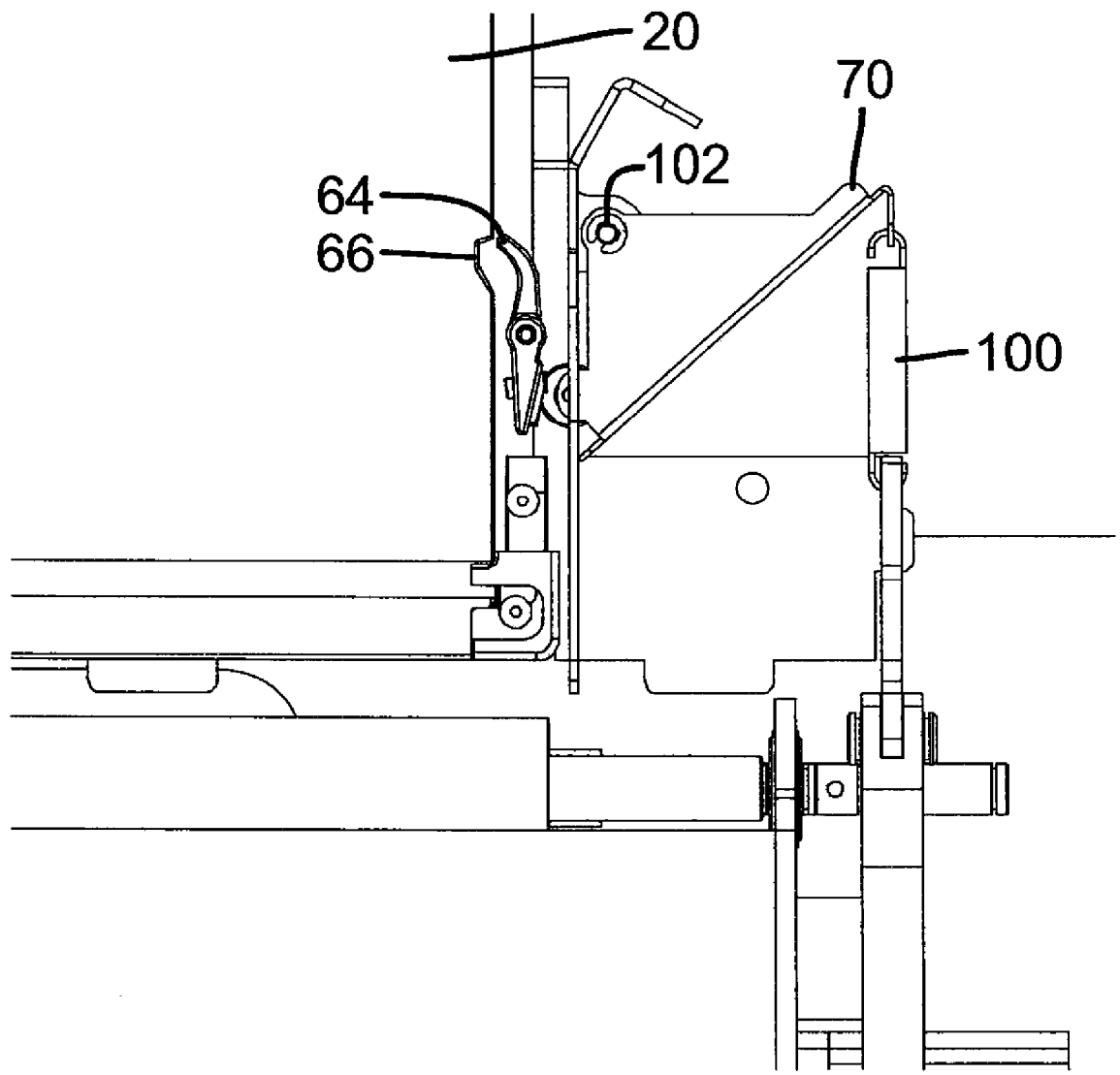
FIG. 20 is a side view of the cassette sheet release mechanism.

FIGS. 19 and 20 show a latch release 70 on cassette loading section 12, with a portion of the obstructing hardware removed for illustrative purposes. In the arrangement shown, a spring 100 exerts a spring force that cooperates with a pivot point 102 so that latch release 70 presses inward, toward cassette 20. Latch release 70, acting as a release member, pivots restraining latch 64 on cassette 20 when the operator inserts cassette 20 into a cassette feed slot 68 (slot 68 is shown in FIG. 14A, and is a component of cassette loading section 12). In addition, the force exerted against cassette 20 urges it against an edge 72 (of cassette loading section 12, as shown in FIGS. 6 and 14A) which aligns cassette 20. Thus, inserting cassette 20 into slot 68 (of cassette loading section 12) provides the release of stimulable phosphor sheet 18 from cassette 20 for scanning and alignment of cassette 20 into edge registration (in the x direction of the yz plane) in the transport path.

It is noted that cassette 20 can be registered in the z direction (of the xy plane) by the addition of a mechanical force, for example, a spring or plunger. This may be desirable if the opening of cassette feed slot 68 is enlarged for manufacturability purposes or for ease of cassette insertion by an operator.

In one arrangement, a sensor (not shown) detects travel of latch release 70 to initiate operation of transport section 30 motors when cassette 20 is installed into cassette feed slot 68. A limit switch or other sensor can be used to detect latch release 70 movement, using techniques and practices known to those skilled in the motion control arts.

In the embodiments shown herein, latch release 70 actuates automatically to release stimulable phosphor sheet 18. Alternatives include coupling a solenoid or other actuator to latch release 70 to release stimulable phosphor sheet 18 under command from control electronics section 28 (FIG. 2).

Gimbaled Scan Mounting

Radiation data reading apparatus 10 has a gimbaled scanning apparatus that enables scan housing 32 (FIG. 8) to register to stimulable phosphor sheet 18 without overconstraint. With this mounting arrangement, scan housing 32 allows a number of degrees of freedom for registration, including allowing some movement along z and x axes and rotation about the x axis ($\theta_x$) and y axis ($\theta_y$). Movement in y and rotation about the z axis ($\theta_z$) are constrained in this arrangement.

Figure 15:
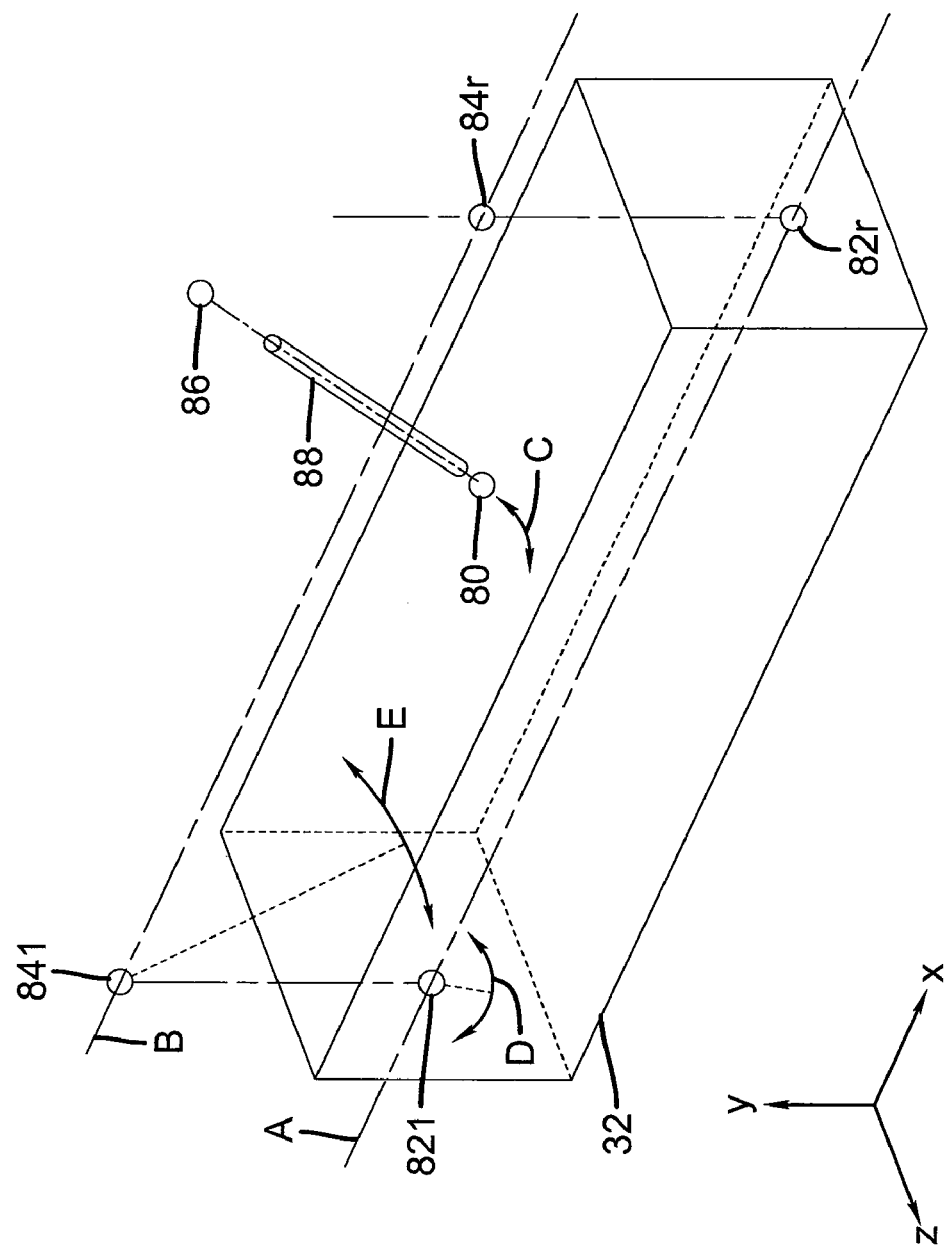
FIG. 15 is a schematic view showing key aspects of gimbaled mounting for scanning and transport components.

FIG. 15 shows schematically scan housing 32 (represented as a rectangular box, without showing rollers 36 of transport section 30 attached) supported from the frame of chassis 14 to provide gimbaled action.

Figure 16:
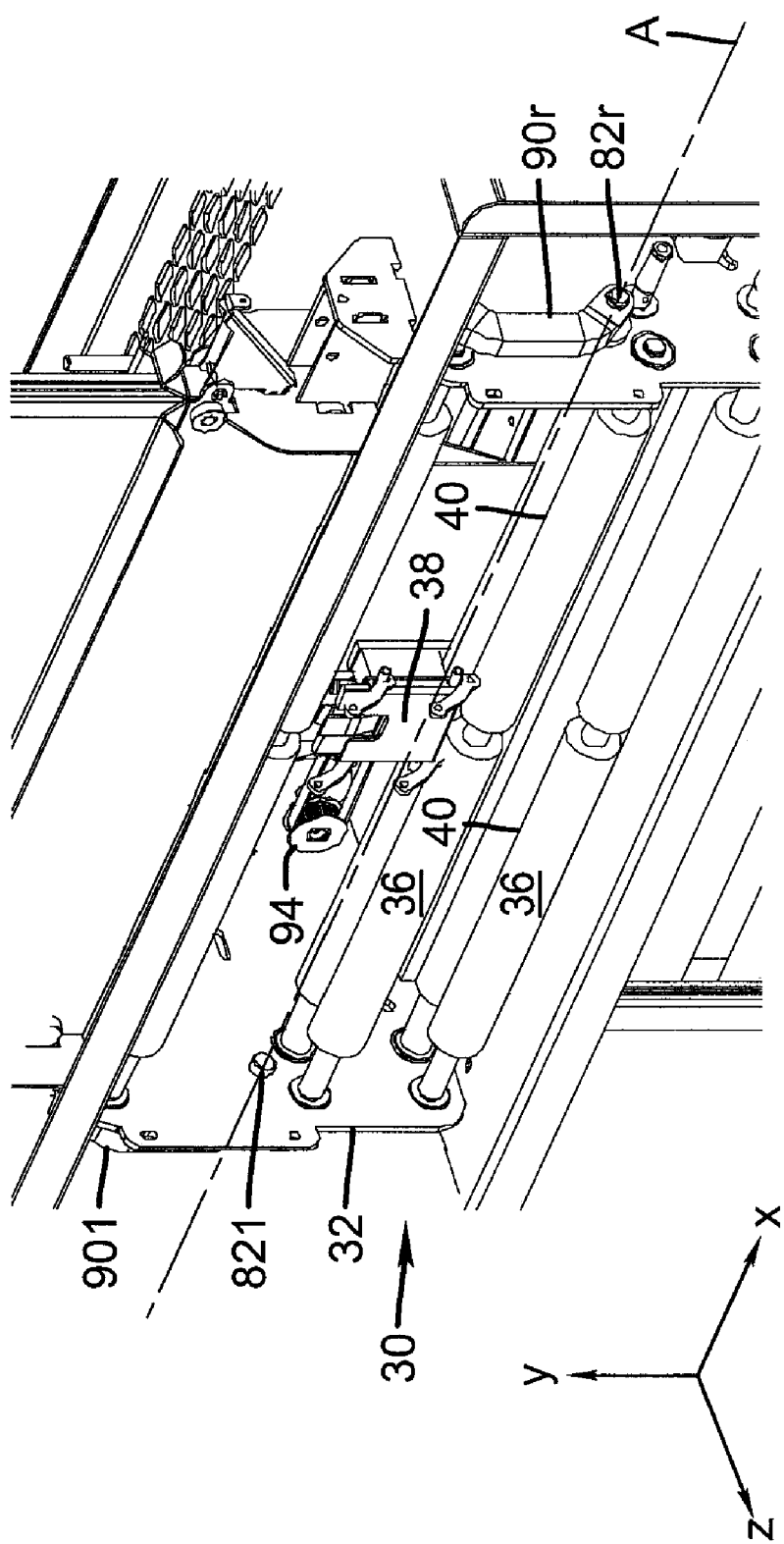
FIG. 16 is a perspective view showing components used for gimbaled mounting.
Figure 17:
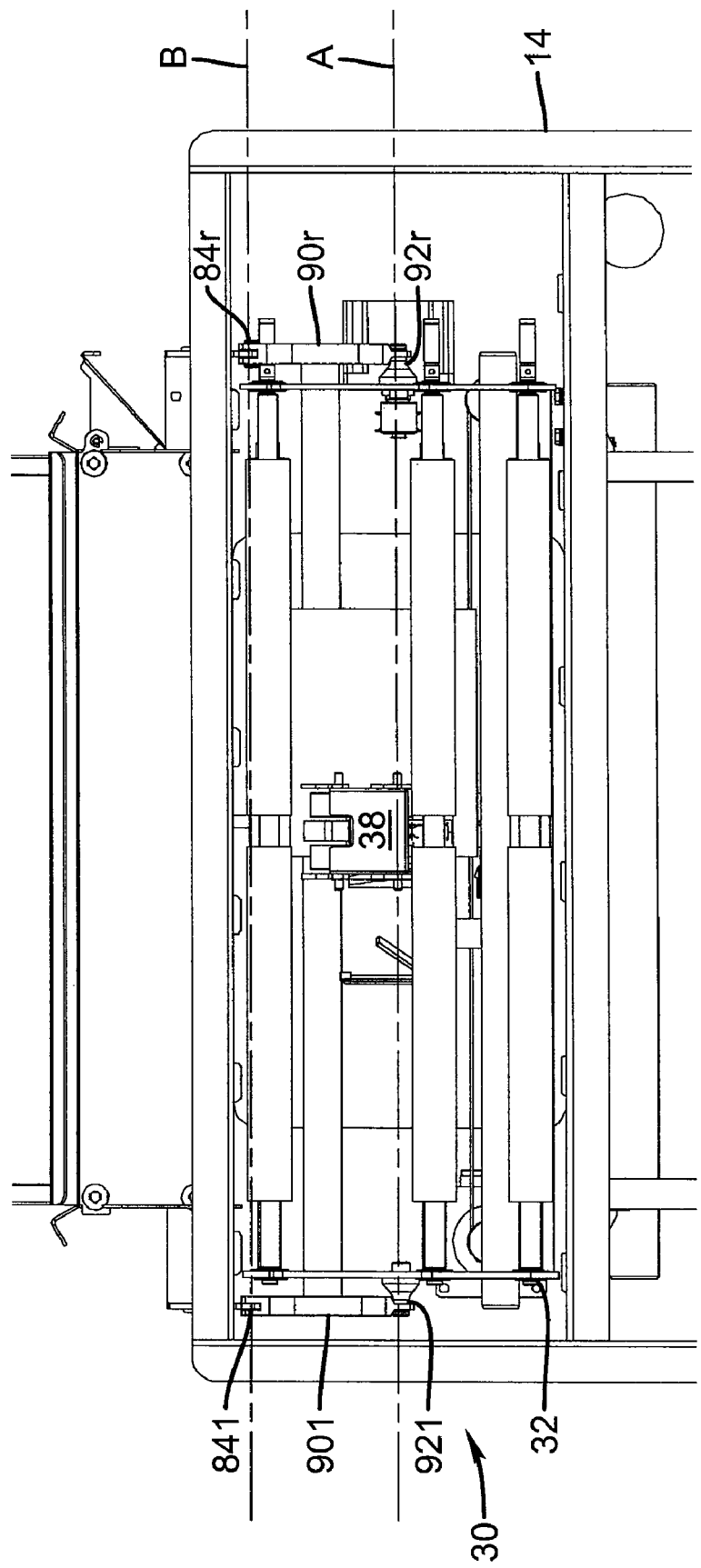
FIG. 17 is a front view showing components used for gimbaled mounting of the scanning section.

FIGS. 16 and 17 show, in front and perspective views respectively, hardware components used to effect this gimbaled arrangement. Along an axis A, parallel to the x axis as shown, scan housing 32 is supported at two suspension points, at the right 82r and at the left 82l. A third suspension point 80 is suspended by a flexible coupling 88, such as a spring, from a fixed point 86 on the frame of chassis 14. Flexible coupling 88 allows a measure of rotation about the x axis ($\theta_x$) and back and forth movement generally in the z direction, as indicated by a dotted line C. Hinges 90r and 90l support suspension points 82r and 82l respectively, allowing a measure of rotation as indicated by a dotted line D. Best shown in FIG. 16, pins 92r and 92l that extend from scan housing 32 are supported within hinges 90r and 90l, each providing essentially a single point of contact. A slight amount of movement in the direction of the x axis is permitted by this arrangement. Flexible coupling 88 is adjustable in one embodiment, enabling fine-tuning of the overall stiffness and angular response range of the gimbaled mount.

Hinges 90r and 90l suspend scan housing 32 from stationary hinge points 84r and 84l, respectively. This allows some rotational movement as indicated by a dotted line E, effectively providing movement in the direction of the optical axis z, with the cooperation of flexible coupling 88. It can be observed that this arrangement constrains movement in the direction of the vertical axis y and constrains rotational movement about the optical axis z ($\theta z$), while allowing some measure of movement along z and x axes and rotation about the x axis ($\theta_x$) and y axis ($\theta_y$).

As is shown in FIGS. 16 and 17, transport section 30, with rollers 36, is attached to scan housing 32, with each roller 36 axially coupled to allow its rotational movement. Thus, when stimulable phosphor sheet 18 is held between at least two nips 40, scan housing 32 registers to the surface of stimulable phosphor sheet 18 in a gimbaled manner.

Referring back to FIG. 15, it can be appreciated that the gimbaled support of scan housing 32 can be effected in a number of ways, but still operate according to the basic principles described earlier. For example, flexible coupling 88 need not be a spring, but can be generalized to be a coupling that allows some measure of movement in rotation about the x axis ($\theta_x$) and movement along the optical axis z. Flexible coupling 88 could suspend scan housing 32 from above as shown in FIG. 15 or could flexibly support scan housing 32 by protruding from below.

With respect to the horizontal axis x, support point 80 is between support points **82*l* and 82*r*. The couplings used for support points 82*l* and 82*r* extend from the supporting frame to the scan housing and provide axial alignment of scan housing 32 relative to the horizontal axis x. Couplings to support points 82*l* and 82*r*** must allow some measure of rotation $\theta_x$ about the horizontal axis x, at least about 2 degrees, but preferably 5 degrees or more rotation.

Support points **82*l* and 82*r* can be supported by suspension from the frame, as depicted in FIG. 15 and shown in the hinged arrangement of embodiments in FIGS. 16 and 17. Alternate arrangements for supporting scan housing 32 at these points can include support from below, such as ball-and-socket support or hinged support, including using a rotatable platform, for example. Whatever gimbaled movement is provided, it is important to support scan housing 32 to constrain movement in the y direction, for example by using gravity to support points 82*l* and 82*r*, and to constrain rotation about the optical z axis, or $\theta_z$. Rollers 36 of transport section 30 are mechanically coupled to scan housing 32, with this 3-point coupling arrangement allowing the gimbaled action that conforms the position of scan housing 32 relative to the surface of stimulable phosphor sheet 18**.

Radiation data reading apparatus 10 as described herein is advantaged for providing controlled guidance of stimulable phosphor sheet 18 along a substantially vertical transport path, minimizing the equipment footprint where floor space is at a premium. Automated extraction, scanning, erasure, and return of stimulable phosphor sheet 18 with cassette 20 allows enhanced efficiency of operation, since the operator need only insert cassette 20 into cassette loading section 12 and remove cassette 20 when the scanning and erasure operations have been completed. Compared with conventional scanning solutions, as described earlier in the background section, the apparatus of the present invention offers a low-cost solution, using gravity feed and offering repeatable operation.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, various types of rollers could be employed. Various types of sensing devices could be used to detect the presence of the phosphor sheet in roller nips. Various types of scanning excitation sources and photoelectric detectors, familiar to those skilled in the diagnostic imaging arts, could be used. The apparatus of the present invention is particularly suitable where the stimulable phosphor sheet is at least semi-rigid, as defined earlier.

Thus, what is provided is an apparatus and method for scanning a stimulable phosphor medium having an exposed radiographic image thereon.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Radiation data reading apparatus
12. Cassette loading/receiving section
14. Chassis
16. Scanning section
18. Phosphor sheet
20. Cassette
22. Erase section
24. Erasure radiation source
26. Power supply
28. Control electronics section
30. Transport section
32. Scan housing
34. Optical scanning apparatus
36. Transport roller
38. Sheet return member
40. Nip
42. End point
44. Motor
46. Urging mechanism
50. Opening
52. Cover
54. Side extrusion
56. Plate
58. Phosphor coating
60. Edge guide features
62. Lead edge
64. Latch
66. Detent
68. Slot
70. Latch release
72. Edge
74. Pivot point
76. Lifting arm
78. Gap
80, 82*r*, 82. Support point
84*r*, 84*l*. Hinge points
86. Fixed point
88. Flexible coupling
90*r*, 90*l*. Hinge
92*r*, 92*l*. Pin
94. Motor
96. Finger
98. Fan
100. Spring
102. Pivot
104. Motor
106. Lifting mechanism
108. Lifting arm
A, B. Axis
C, D, E. Dotted line
F. Arrow

The invention claimed is:

1. A scanning apparatus for scanning a sheet as the sheet is transported in a substantially vertical transport direction y transverse to an optical axis z that is normal to the surface of the sheet, the scanning apparatus comprising:
    a scan housing supporting an optical scanning apparatus and extending in the direction of a substantially horizontal axis x;
    a first coupling extending from a supporting frame to a first support point on the scan housing;
    second and third couplings extending from the supporting frame to the scan housing, wherein the second and third couplings provide axial alignment relative to the horizontal axis x, wherein, relative to the horizontal axis x, the first coupling is disposed between the second and third couplings, and wherein the second and third couplings allow at least two degrees of rotation of the scan housing with respect to the horizontal axis x and constrain movement of the scan housing in the substantially vertical transport direction y; and a transport apparatus coupled to the scan housing for aligning the sheet relative to the scan housing in the substantially vertical transport direction.

2. The scanning apparatus of claim 1 wherein the first coupling comprises a spring.

3. The scanning apparatus of claim 1 wherein the optical scanning apparatus comprises at least one CCD sensor.

4. The scanning apparatus of claim 1 wherein the scan housing further comprises a transport assembly adapted to translate the optical scanning apparatus across the surface of the sheet.

5. The scanning apparatus of claim 1 wherein the optical scanning apparatus comprises a scanning laser.

6. The scanning apparatus of claim 1 wherein the first coupling suspends the scan housing from the frame.

7. The scanning apparatus of claim 1 wherein the first coupling supports the scan housing from below.

8. The scanning apparatus of claim 1 wherein at least one of the second and third couplings comprises a hinge.

9. The scanning apparatus of claim 1 wherein the second and third couplings support the scan housing from below.

10. The scanning apparatus of claim 1 wherein the first coupling is adjustable.

11. A scanning apparatus for scanning a sheet as the sheet is transported in a substantially vertical transport direction y transverse to an optical axis z that is normal to the surface of the sheet, the scanning apparatus comprising:

a scan housing supporting an optical scanning apparatus and extending in the direction of a substantially horizontal axis x;

a first coupling extending from a supporting frame to a first support point on the scan housing;

second and third couplings extending from the supporting frame to the scan housing, wherein the second and third couplings provide axial alignment relative to the horizontal axis x, wherein, relative to the horizontal axis x, the first coupling is disposed between the second and third couplings, and wherein the second and third couplings allow at least two degrees of rotation of the scan housing with respect to the horizontal axis x and constrain movement of the scan housing in the substantially vertical transport direction y; and a transport apparatus comprising at least one roller and coupled to the scan housing for aligning the sheet relative to the scan housing in the substantially vertical transport direction.

12. The scanning apparatus of claim 11 wherein the first coupling supports the scan housing from below.

13. The scanning apparatus of claim 11 wherein the second and third couplings support the scan housing from below.

14. The scanning apparatus of claim 11 wherein the first coupling is adjustable.

* * * * *